United States Patent
Ahammer et al.

(10) Patent No.: US 10,865,054 B2
(45) Date of Patent: Dec. 15, 2020

(54) METHOD FOR SORTING CONVEYED OBJECTS ON A CONVEYOR SYSTEM

(71) Applicant: TGW LOGISTICS GROUP GMBH, Marchtrenk (AT)

(72) Inventors: Christian Ahammer, Gunskirchen (AT); Harald Johannes Schroepf, Wels (AT)

(73) Assignee: TGW LOGISTICS GROUP GMBH, Marchtrenk (AT)

( * ) Notice: Subject to any disclaimer, the term of this patent is extended or adjusted under 35 U.S.C. 154(b) by 116 days.

(21) Appl. No.: 16/064,029

(22) PCT Filed: Dec. 21, 2016

(86) PCT No.: PCT/EP2016/082068
§ 371 (c)(1),
(2) Date: Aug. 13, 2018

(87) PCT Pub. No.: WO2017/108885
PCT Pub. Date: Jun. 29, 2017

(65) Prior Publication Data
US 2019/0033835 A1 Jan. 31, 2019

(30) Foreign Application Priority Data
Dec. 21, 2015 (AT) .............................. A 51086/2015

(51) Int. Cl.
*B65G 43/10* (2006.01)
*B65G 47/68* (2006.01)
(Continued)

(52) U.S. Cl.
CPC ............... *B65G 43/10* (2013.01); *B65G 1/16* (2013.01); *B65G 43/08* (2013.01); *B65G 47/681* (2013.01);
(Continued)

(58) Field of Classification Search
CPC ....... B65G 43/10; B65G 47/681; B65G 43/08
See application file for complete search history.

(56) References Cited

U.S. PATENT DOCUMENTS 2,441,469 A * 5/1948 Cameron ............. B65G 47/681
198/524
3,223,225 A * 12/1965 Clark ................... B65G 47/681
198/357
(Continued)

FOREIGN PATENT DOCUMENTS

CN 1733575 A 2/2006
CN 201169390 Y 12/2008
(Continued)

OTHER PUBLICATIONS

Letter from the European Patent Attorney to the European Patent Office in PCT/EP2016/082068, dated Sep. 7, 2017, with English translation of relevant parts.
(Continued)

*Primary Examiner* — Thomas Randazzo
(74) *Attorney, Agent, or Firm* — Collard & Roe, P.C.

(57) ABSTRACT

In a first step of a method for bundling conveyed streams on a material handling element including a number of incoming conveyor segments, at least one coupling to an outgoing conveyor segment, on which the incoming conveyor segments converge, and a number of holding devices for holding a conveyed stream on the incoming conveyor segments, the conveyed objects are vectorially combined in in ascending/descending order according to a desired sorting sequence. When a conveyed object passes the material handling element a vector corresponding to the actual sequence is entered in the vector combination. Conveyed objects are released if a ring with a constant direction is
(Continued)

avoided in the vector combination. A material handling element carries out the method.

29 Claims, 18 Drawing Sheets

(51) Int. Cl.
  *B65G 43/08* (2006.01)
  *G05B 19/418* (2006.01)
  *B65G 1/16* (2006.01)

(52) U.S. Cl.
  CPC ... *G05B 19/4189* (2013.01); *G05B 19/41865* (2013.01); *G05B 2219/31378* (2013.01); *G05B 2219/32037* (2013.01); *G05B 2219/45047* (2013.01); *Y02P 90/02* (2015.11)

(56) References Cited

U.S. PATENT DOCUMENTS

| | | | | |
|---|---|---|---|---|
| 3,270,861 | A * | 9/1966 | Reed | B65G 47/681 198/779 |
| 3,747,781 | A * | 7/1973 | Daigle | B65G 47/50 198/463.3 |
| 4,249,661 | A * | 2/1981 | Lem | B65G 47/54 209/564 |
| 4,265,356 | A * | 5/1981 | Glover | B65G 47/681 198/444 |
| 5,501,571 | A * | 3/1996 | Van Durrett | G05B 19/4189 414/801 |
| 5,733,098 | A | 3/1998 | Lyon et al. | |
| 9,555,978 | B1 * | 1/2017 | Hanssen | B65G 1/1378 |
| 10,239,704 | B2 * | 3/2019 | Messner | B65G 1/0492 |
| 2002/0179502 | A1 | 12/2002 | Cerutti et al. | |
| 2004/0193311 | A1 | 9/2004 | Winkler | |
| 2004/0254674 | A1 * | 12/2004 | Nojo | G05B 19/4189 700/213 |
| 2007/0129843 | A1 * | 6/2007 | Lupton | B65G 43/10 700/223 |
| 2007/0246328 | A1 * | 10/2007 | Reznik | B65G 47/844 198/444 |
| 2009/0065330 | A1 * | 3/2009 | Lupton | B65G 43/08 198/357 |
| 2009/0099686 | A1 * | 4/2009 | Yoshikawa | B65G 37/02 700/228 |
| 2010/0122942 | A1 * | 5/2010 | Harres | B07C 3/00 209/584 |
| 2011/0301745 | A1 | 12/2011 | Culp et al. | |
| 2012/0057479 | A1 | 3/2012 | Maruyama et al. | |
| 2012/0222992 | A1 | 9/2012 | Girodet et al. | |
| 2014/0142747 | A1 * | 5/2014 | Magato | B65G 47/681 700/230 |
| 2015/0104286 | A1 | 4/2015 | Hansl et al. | |
| 2015/0336741 | A1 | 11/2015 | Ahammer et al. | |
| 2016/0221762 | A1 * | 8/2016 | Schroader | B65G 43/08 |

FOREIGN PATENT DOCUMENTS

| | | |
|---|---|---|
| CN | 101446824 A | 6/2009 |
| CN | 102639414 A | 8/2012 |
| CN | 102968100 A | 3/2013 |
| CN | 103037986 A | 4/2013 |
| CN | 103403193 A | 11/2013 |
| CN | 203287937 U | 11/2013 |
| CN | 105523372 A | 4/2016 |
| DE | 10 2007 010 191 A1 | 9/2008 |
| EP | 0 697 351 A1 | 2/1996 |
| EP | 0 834 354 A1 | 4/1998 |
| EP | 0 853 984 A1 | 7/1998 |
| EP | 0 856 479 A1 | 8/1998 |
| EP | 1 209 104 A1 | 5/2002 |
| EP | 1 462 393 A1 | 9/2004 |
| JP | 2004-277074 A | 10/2004 |
| JP | 2009-227443 A | 10/2009 |
| WO | 2013/150080 A1 | 10/2013 |
| WO | 2015/032402 A1 | 3/2015 |
| WO | 2017/108885 A2 | 6/2017 |

OTHER PUBLICATIONS

Gurski et al, "On the complexity of the FIFO stack-up problem," Math Meth Oper Res (2016) 83:33-52.

Dematic Sequencing Simulation (https://www.youtube.com/watch?v=X4BrJrO8db4&feature=youtu.be&t=26) Nov. 4, 2011.

Gurski et al, "Complexity of the FIFO Stack-Up Problem", Computer Science, revised Oct. 15, 2015 (version 6) 1 page (https://arxiv.org/abs/1307.1915v6).

Yong-Hee Han, A Thesis Presented to The Academic Faculty, Dynamic Sequencing of Jobs on Conveyor Systems for Minimizing Changeover, (http://citeseerx.ist.psu.edu/viewdoc/download?doi=10.1.1.91.2813&rep=rep1&type=pdf) Nov. 18, 2004.

International Search Report of PCT/EP2016/082068, dated Jul. 17, 2017.

International Search Report of PCT/EP2016/082091, dated May 16, 2017.

Fuss et al. "Determination of the performance availability of a modular sorter", 2016 Logistics Journal: Proceedings—ISSN 2192-9084, pp. 1-9.

* cited by examiner

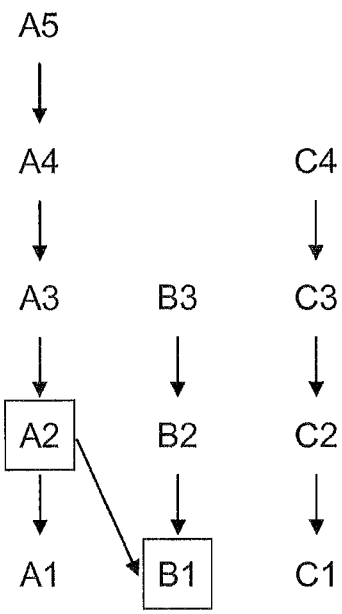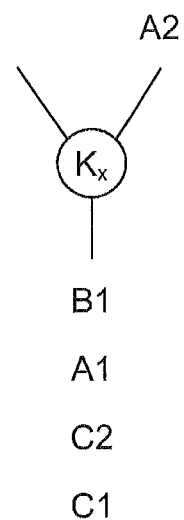
Fig. 14    Fig. 15
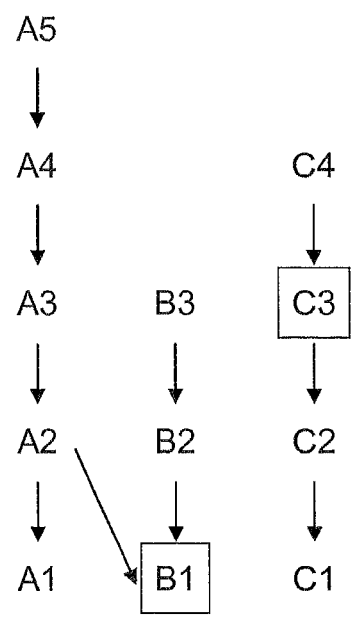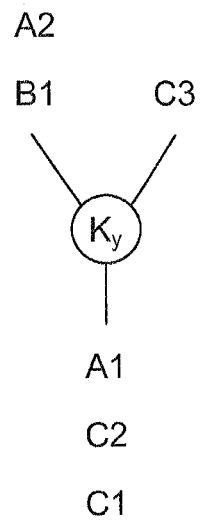
Fig. 16    Fig. 17

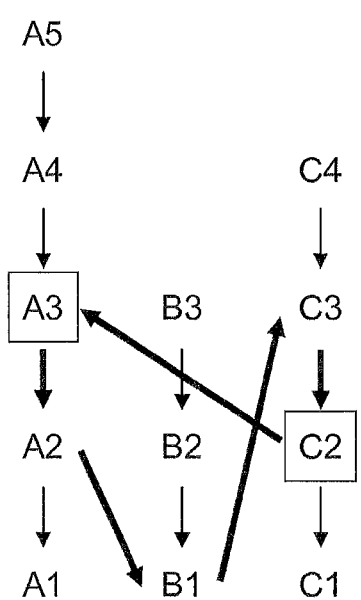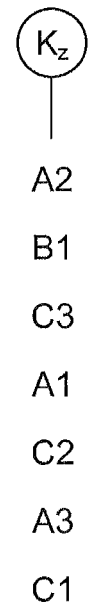
Fig. 22    Fig. 23
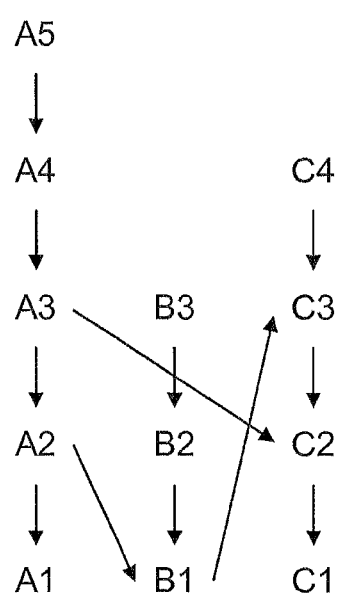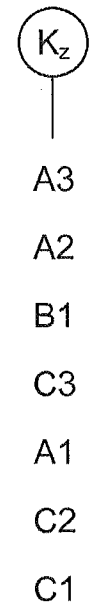
Fig. 24    Fig. 25

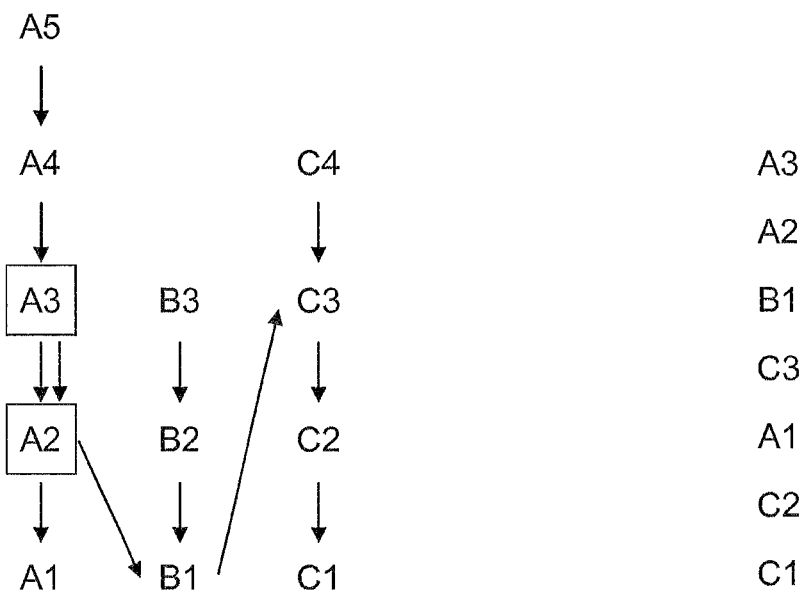
Fig. 38
Fig. 39
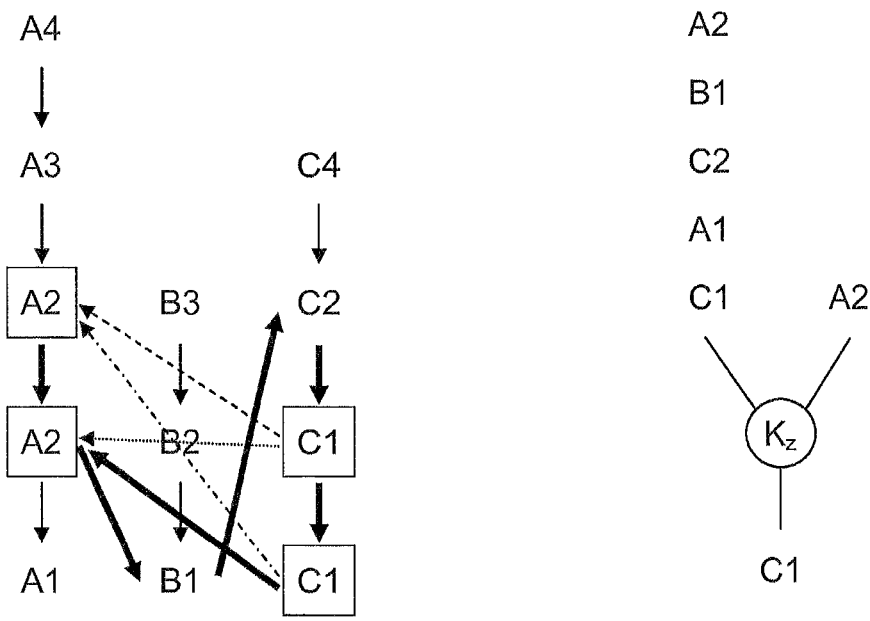
Fig. 40
Fig. 41

METHOD FOR SORTING CONVEYED OBJECTS ON A CONVEYOR SYSTEM

CROSS REFERENCE TO RELATED APPLICATIONS

This application is the National Stage of PCT/EP2016/082068 filed on Dec. 21, 2016, which claims priority under 35 U.S.C. § 119 of Austrian Application No. A 51086/2015 filed on Dec. 21, 2015, the disclosure of which is incorporated by reference. The international application under PCT article 21(2) was not published in English.

BACKGROUND OF THE INVENTION

1. Field of the Invention

The invention relates to a method for bundling conveyed streams at a material handling element/node with a plurality of incoming conveyor segments, at least one coupling to an outgoing conveyor segment to which the incoming conveyor segments are converged together, and a plurality of holding devices for stopping conveyed objects or a flow on the incoming conveyor segments. Furthermore, the invention relates to a material handling element/node for bundling conveyed streams with a plurality of incoming conveyor segments, at least one coupling for an outgoing conveyor segment to which the incoming conveyor segments are converged together, and a plurality of holding devices for stopping conveyed objects or a flow on the incoming conveyor segment. Lastly, the invention also relates to a conveyor system comprising a plurality of such material handling elements/nodes, wherein at least one coupling for an outgoing conveyor segment of one material handling element/node is connected directly or indirectly to an incoming conveyor segment of another material handling element/node.

2. Description of the Related Art

A method, a material handling element and a conveyor system of the said kind are known in principle. Here a plurality of incoming conveyed streams on a material handling element are stopped if necessary and conveyed on one or more outgoing conveyor flows in order to direct conveyed objects specifically to one or more destinations. In general, a superordinate controller manages a series of picking orders and controls the elements of the conveyor system so that the conveyed objects assigned to a destination (e.g. a picking station) are taken from a storage and transported to the said destination, in particular in a predefined order or sequence. For this purpose sensors are arranged along the conveying path, which sensors register the passing conveyed objects and inform the superordinate controller, so that the latter has information about where a particular conveyed object is located at any moment and how the conveyor system should be controlled on this basis. In particular if there are many destinations to be supplied and a large number of different objects to be transported the task of controlling this by means technology is very complex which makes the operation and particularly the start-up of a conveyor system more difficult.

In a simple embodiment of such a controller a conveyed object that passes such a sensor can trigger the release of the incoming conveyed stream at a material handling element. This simplified method only allows a moderate throughput through the conveyor system and therefore only a small number of executed orders per unit of time.

SUMMARY OF THE INVENTION

An objective of the invention is therefore to provide an improved method and an material handling element for bundling conveyed streams. In particular, in this way the complexity of a controller for a conveyor system is reduced and the throughput through the latter is increased.

The objective of the invention is achieved by a method of the aforementioned kind, in which
- the conveyed objects are linked vectorially according to their target sorting sequence in ascending/descending order,
- the conveyed objects with different target sorting sequences, which pass the material handling element/node, are linked vectorially according to their actual sequence in ascending/descending order and
- conveyed objects waiting at a material handling element/node are released in such a sequence which avoids the formation of a ring with a constant sense of direction in the vectorial coupling.

The objective of the invention is also achieved with a material handling element/node of the aforementioned kind, additionally comprising
- a controller, which is configured to vectorially link conveyed objects of different target sorting sequences, which are vectorially linked according to their respective target sorting sequence in ascending/descending order and which pass the material handling element/node according to their respective actual sequence in ascending/descending order, and
- releasing conveyed objects waiting at a material handling element/node in such a sequence which avoids forming a ring with a constant sense of direction in the vectorial coupling.

Lastly, the objective of the invention is also achieved by a conveyor system with a plurality of material handling elements/nodes of the aforementioned kind, wherein at least one coupling for an outgoing conveyor segment of one material handling element/node is connected directly or indirectly to an incoming conveyor segment of another material handling element/node.

By means of the proposed measures a simple rule for directing and sorting conveyed objects is provided which still enables a high rate of throughput. Specifically the conveyed objects are linked vectorially in a first step according to a target sorting sequence. If a conveyed object passes a material handling element/node, then the thereby determined dependency between the conveyed objects is also entered into the vectorial coupling. A conveyed object is then released if its release does not create a ring with constant sense of direction in the vectorial coupling. In this way it can be ensured that the conveyed objects reach their destinations in a desired sequence.

The term "material handling element" is defined in the invention to means every device for conveying and/or manipulating conveyed objects, which merges conveyed streams and continues to run via an outgoing conveyor segment or a plurality of such segments. In particular, said material handling element can also be referred to as a node, over which conveyed streams are guided. Specific examples of such material handling elements include all kinds of channelers, confluences of secondary conveyers into a main conveyor, turntables, but also robots for removing conveyed objects from storage, such as for example storage and retrieval machines and autonomous conveying vehicles ("shuttles") and vertical conveyors such as lifts and paternosters. All of these elements can concentrate conveyed streams from a plurality of incoming conveyor segments to a node. In the case of lifts and paternosters conveyed streams from several levels are concentrated into a few conveyed streams (generally on lower levels). A storage and retrieval machine can be defined as a material handling element which concentrates conveyed streams from a plurality of storage spaces (generally) to an output conveying flow. Throughout the description of the invention the terms "material handling element" and "node" are used synonymously.

The "conveyor segments" can generally also be seen as logical conveyor segments and should not necessarily be considered to be purely physical. For example, a storage and retrieval machine can be a v-to-w-multiplexer, wherein v indicates the number of storage spaces reached by the storage and retrieval machine and w indicates the number of objects transported simultaneously by the storage and retrieval machine. Although physically only a single storage and retrieval machine is provided, the latter can still be considered to be a logical node which comprises v incoming conveyor segments and w outgoing conveyor segments. It is also possible that only one single conveyor segment leads away from one node. Said node then corresponds to a v-to-1-multiplexer.

The term "holding device" is used in the description of the invention to define all elements for halting a conveyed stream. For example the latter include barriers which can be inserted or positioned in the conveyed stream. A holding device can also consist of conveyor belts, conveyor chains, conveyor rollers and the like, which can be stopped (i.e. are not just loosely mounted). Said conveying means are generally used for both conveying and also stopping conveyed objects.

It is thus conceivable according to the invention that a holding device is assigned to each of the incoming conveyor segments and also that only a portion of the incoming conveyor segments of a material handling element is assigned a respective holding device. In particular, it is possible that one holding device is assigned to each incoming conveyor segment.

For example a "conveyor system" can also comprise, in addition to the already mentioned material handling elements/nodes of the aforementioned kind, a warehouse, storage and retrieval machines, lifts, paternosters, conveyor belts, roller conveyors, order picking stations and the like.

For determining the actual position of a conveyed object on a conveyor system sensors and reading devices can be used for example, which make it possible to identify a conveyed object. For example, the latter include barcode readers, RFID readers (Radio Frequency Identification) and video cameras. Other sensors for measuring a physical property of a conveyed object, such as example the length, weight, color and the like, can be used in principle as a triggering device, in particular if a plurality of physical properties are measured which are suitable for identifying a conveyed object. For example this can be a combination of a specific value range of an object length, a specific value range of an object weight and a specific value range of an object color.

The term "downstream" is used in the invention to refer generally to places which follow a reference point in conveying direction of the conveyed objects. A conveyed object thus reaches the said reference point first in terms of time and then afterwards downstream places or positions.

The term "upstream" is the opposite of "downstream". A conveyed object thus reaches upstream places or positions first in terms of time and then the said reference point.

The "conveying direction" refers to the direction in which the conveyed objects move on the conveyor system (in normal operation).

A moved conveyed object (and in particular a plurality of moved conveyed objects) forms/form a "flow" or "conveyed stream".

It should also be noted at this point that the vectorial coupling of the conveyed objects should be formed consistently according to the target sorting sequence or according to the actual sequence of the latter. This means that the conveyed objects are linked vectorially in ascending order according to their target sorting sequence, then the conveyed objects are also linked vectorially in ascending order according to their actual sequence. Furthermore, there is no change within the target sorting sequence and the actual sequence. This means that the conveyed objects are linked continuously in ascending order in the target sorting sequence and the actual sequence. By analogy this also applies to a link in descending order. In this case the conveyed objects in the target sorting sequence and the actual sequence are continuously linked vectorially in descending order.

Advantageous embodiments and developments of the invention are described below.

It is advantageous if conveyed objects waiting at a node are only released in such a sequence, which avoids the formation of a ring with a constant sense of direction of the vectorial coupling. In this way a required sorting sequence can be achieved without error.

It is particularly advantageous if:

for at least those conveyed objects waiting at the material handling element/node, evaluation parameters are calculated which avoid the formation of a ring with a constant sense of direction in the vectorial coupling, the evaluation parameters are calculated a) by means of a priority of a sorting sequence, wherein higher priorities lead to larger/smaller evaluation parameters, and/or b) a spatial and/or time interval between the waiting conveyed objects and the preceding conveyed objects in at least one sorting sequence are calculated, wherein conveyed objects downstream of the material handling element/node are evaluated positively/negatively and conveyed objects upstream of the material handling element/node are evaluated negatively/positively and the particular conveyed object is released to which the largest/smallest evaluation parameter is assigned.

This embodiment variant is particularly suitable if a plurality of conveyed objects are waiting at a material handling element/node, the release of which would not form a ring with a constant sense of direction in the vectorial coupling. In principle, one of the conveyed objects in question is randomly selected and released, however it is advantageous if an evaluation parameter is used. On the one hand this can indicate a priority of a sorting sequence (case a). For example the processing of the sorting sequence or supply to a destination can be more important than processing another sorting sequence or than supplying another destination and can thus be prioritized more highly. Alternatively or additionally, the evaluation parameter can be calculated by means of a spatial and/or time interval between the waiting conveyed objects and the preceding conveyed objects in at least one sorting sequence (case b). If the conveyed object preceding the conveyed object waiting at the material handling element/node has already advanced a long way in the flow, the release of such a conveyed object is preferred so as not to delay the completion of a sorting sequence. Thus a conveyed object can wait without negative effects if its predecessor has not yet advanced very far in the flow or is even still in front of the relevant node. A total evaluation parameter can be defined for example as a sum or product of the evaluation parameters determined according to case a) and case b).

The above calculation of the evaluation parameter is mainly suitable when the two conveyed objects considered (i.e. the conveyed object waiting at the said node and the preceding conveyed object in the sorting sequence) are transported on the same path and/or pass the said node at least on their path.

It should be noted at this point that the explained release of conveyed objects by means of an evaluation parameter can also be applied without the vectorial coupling. Furthermore, another sorting algorithm can also be superordinate to the release of conveyed objects by means of an evaluation parameter.

It is advantageous, if the said spatial distance is determined by means of a length of a conveyed stream, the ends of which are between a waiting conveyed object and the preceding conveyed object in a sorting sequence. The length of the said conveyed stream corresponds to the path that the conveyed object waiting at the material handling element/node has to cover in order to reach the position at which the preceding conveyed object in the sorting sequence is located. The said length can thus be defined as a length unit, for example in meters.

It is also advantageous if the said spatial distance is determined by means of the number of conveyed objects which are between a waiting conveyed object and the preceding object conveyed in a sorting sequence. In this way the evaluation parameter can be calculated more easily if necessary.

Furthermore, it is advantageous if the said spatial distance is determined by means of the number of material handling elements/nodes between a waiting conveyed object and the preceding conveyed object in a sorting sequence. This is a further way of determining the evaluation parameter in a relatively simple manner.

In a further advantageous embodiment variant of the proposed method the said spatial distance is determined by means of the number of vectors in the vectorial coupling, which are between a waiting conveyed object and the preceding conveyed object in a sorting sequence. Lastly, this also provides another way of determining the evaluation parameter in a relatively simple manner.

It is also advantageous if the said time interval is determined by means of the time taken to run through of a conveyed stream, the ends of which are between a waiting conveyed object and the preceding conveyed object in a sorting sequence. The said time period corresponds to the time that the conveyed object waiting at the material handling element/node needs to reach the position at which the preceding conveyed object in the sorting sequence is located. The said time interval can thus be expressed as a unit of time, for example in seconds.

Furthermore, it is particularly advantageous if:
for at least those conveyed objects waiting at the material handling element/node evaluation parameters are calculated, which avoid a ring with a constant sense of direction in the vectorial coupling,
the evaluation parameters a) are calculated by means of a priority of a sorting sequence, wherein higher priorities result in greater/smaller evaluation parameters, and/or
b) are calculated by means of differences of spatial and/or time intervals, wherein a difference is defined as a spatial and/or time interval of a waiting conveyed object to a destination or downstream material handing element/node minus a spatial and/or time interval of the preceding conveyed object in a sorting sequence to said destination or at said downstream material handling element/node and
the particular conveyed object is released which is assigned the greatest/smallest evaluation parameter.

Said embodiment variant is also particularly suitable if a plurality of conveyed objects are waiting at a material handing element/node, the release of which would not form a ring with a constant sense of direction in the vectorial coupling. In addition, an evaluation parameter is used which can be based on a priority of a sorting sequence (case a). For example, the execution of the sorting sequence or supply of a destination may be more important than the execution of another sorting sequence or than the supply of another destination and thus prioritized more highly. Alternatively or additionally, the evaluation parameter can be calculated by means of the aforementioned difference of a spatial and/or time interval (case b). If the conveyed object preceding the conveyed object waiting at the material handing element/node has already proceeded far in the flow, the release of such a conveyed object should be preferred so as not to delay the completion of a sorting sequence. Accordingly, a conveyed object can wait without negative effects if its predecessor in the flow has not yet advanced very far or is still located a long way from the next crossing point of the two conveyed objects. A total evaluation parameter can be defined for example as the sum or product of the evaluation parameters determined according to case a) and case b).

The above calculation of the evaluation parameter is mainly suitable if the two conveyed objects concerned (i.e. the conveyed object waiting at the said node and the preceding conveyed object in the sorting sequence) are not transported on the same path and/or do not pass the said node on their path.

It should be noted at this point that the explained released of conveyed objects by means of an evaluation parameter can also be applied even without the vectorial coupling. Furthermore, also another sorting algorithm can be superordinate to the release of conveyed objects by means of an evaluation parameter.

It is advantageous if the said difference is determined by means of a length of a conveyed stream, the ends of which are between the waiting conveyed object and the said destination or the said downstream material handing element/node, and the length of a conveyed stream, the ends of which are between the preceding conveyed object in a sorting sequence and the said destination or the said downstream material handling element/node. The difference thus corresponds to the path which the conveyed object waiting at the material handling element/node has to cover in order to be the same distance from a reference position (joint destination or downstream material handling element) as the preceding conveyed object in the sorting sequence. The said difference can thus be given as a length unit, for example in meters.

It is also advantageous if the said difference is determined by means of the number of conveyed objects which are between the waiting conveyed object and said destination or the said downstream material handing element/node, and the number of conveyed objects is determined which are between the preceding conveyed object in a sorting sequence and the said destination or the said downstream material handing element/node. In this way the evaluation parameter can also be calculated more easily.

It is also advantageous if the said difference is determined by means of the number of material handing elements/node which are between the waiting conveyed object and the said destination or the said downstream material handling element/node, and the number of material handling elements/nodes is determined which are between the preceding conveyed object in a sorting sequence and the said destination or the said downstream material handling element/node. This also makes it possible to determine the evaluation parameter in a relatively simple manner.

In a further advantageous embodiment of the proposed method the said difference is determined by means of the number of vectors in the vectorial coupling which are between the waiting conveyed object and the said destination or the said downstream material handling element/node, and by means of the number of vectors which are between the preceding conveyed object in a sorting sequence and the said destination or the said downstream material handling element/node. This also makes it possible to determine the evaluation parameter in a relatively simple manner.

It is also advantageous if the said difference is determined by the time taken to run through of a conveyed stream, the ends of which are between the waiting conveyed object and the said destination or the said downstream material handling element/node, and the time taken by a conveyed stream is determined, the ends of which are between the preceding conveyed object in a sorting sequence and the said destination or the said downstream material handling element/node. The difference thus corresponds to the time interval that the conveyed object waiting at the material handling element/node requires in order to cover (in terms of time) the same length to a reference position (common destination or downstream material handling element) as the preceding conveyed object in the sorting sequence. The said difference can thus be given as a unit of time, for example in seconds.

It is also particularly advantageous if:
  a conveyed object waiting at a node is released, which produces a ring with the same sense of direction of the vectorial coupling, if a) the assigned evaluation parameter exceeds/does not meet a threshold and if b) a space is free or becomes free in a buffer, sequencer, alternative route or feedback route or diversification downstream of the node, when the said conveyed object arrives as planned at the buffer, the sequencer, the alternative route or the feedback route and
  the conveyed object is transported into the latter.

In particular for all conveyed objects waiting at the material handling element/node evaluation parameters are calculated or at least until the evaluation parameter exceeds or does not meet the threshold. In this variant of the proposed method thus errors in a sorting sequence can be deliberately allowed and corrected at a later time point, if the evaluation parameter for the relevant object is very high and the further transport of the object is therefore important. Inaccuracies in a sequence are deliberately allowed in this embodiment variant in favor of high throughput. In this way there may be a mix-up in the actual sequence formed and thus a deviation from the target sequence, but also there is less likelihood of blockages in the conveyor system and the throughput increases. If necessary, the conveyed objects can also run through a sorting stage before reaching the destination, in order to achieve an accurate actual sequence. By means of presorting, said sorting stage can be kept small and therefore only takes up a small amount of space.

In principle, it is possible that both a first conveyed object due to exceeding/not meeting the threshold would need to be released by an evaluation parameter as well as another, second conveyed object by means of a priority of a sorting sequence (cf. case "a" above) and/or a spatial and/or time interval (cf. case "b" above). The proposed method can thus be designed so that the first conveyed object is released with priority and the second conveyed object thus waits for the release of the first conveyed object. Thus it is also possible that evaluation parameters are calculated firstly for those conveyed objects that form a ring with a constant sense of direction of the vectorial coupling, and evaluation parameters are only calculated for those conveyed objects which do not form a ring with a constant sense of direction of the vectorial coupling if no first conveyed object is released. The proposed method can also be configured however so that the second conveyed object is released with priority and the first conveyed object then waits for the release of the second conveyed object. Thus it is also possible that evaluation parameters are calculated first for those conveyed objects which do not form a ring with a constant sense of direction of the vectorial coupling, and evaluation parameters for those conveyed objects, which form a ring with a constant sense of direction of the vectorial coupling, are only calculated if no second conveyed object is to be released.

It should be noted at this point that the explained release of conveyed objects, which leads to a temporary error in the sorting sequence, can also be applied even without the vectorial coupling and/or without the presented calculation of the evaluation parameter. Furthermore, another method for calculating an evaluation parameters can be superordinate to the release of conveyed objects, leading to a temporary error in the sorting sequence and also another sorting algorithm and/or another method for prioritizing conveyed objects.

It is advantageous with the aforementioned variant, if the vector closing said ring
  is not entered into the vectorial coupling or
  is deleted from the vectorial coupling, when the said conveyed object is transported into the buffer, the sequencer, the alternative route or the feedback route.

It is ensured in this way that the sorting algorithm based on the vectorial coupling is performed correctly, as soon as the conveyed object causing the sorting error is located in the buffer, in the sequencer, in the alternative route or in the feedback route.

The term "buffer" is defined in the invention as an element of conveying technology for the temporary holding of a conveyed object or a plurality of conveyed objects. The ejection from the buffer is not necessarily optional depending on the design and configuration.

A "sequencer" is a special type of a buffer with optional access. This means that each conveyed object stored temporarily in the sequencer can be transferred independently of other temporarily stored conveyed objects into a conveyed stream.

An "alternative route" can be defined as a partially parallel guided conveyed stream.

In a "feedback route" inputs and outputs of at least two material handling elements/nodes are connected to one another directly or indirectly. "Directly" means in this context that the coupling for an outgoing conveyor segment of one material handling element is connected, without the interconnection of other elements, to an incoming conveyor segment of another material handling element, "indirectly" means the opposite.

A common element of the buffer, sequencer, alternative route and feedback route is a divergence or division of the conveyed stream. A corresponding material handling element/corresponding node therefore comprises a plurality of outgoing conveyor segments. A further reason for the divergence/division of the conveyed stream can be that an outgoing conveyed stream is directed into different areas of a conveyor system or to different destinations (in particular order picking workstations).

It is also advantageous if the material handling elements/nodes have writing and/or reading access to a common vectorial coupling of the conveyed objects to form a sorting sequence for a destination to be supplied or a plurality of such sequences for a plurality of destinations to be supplied in a conveyor system with a plurality of material handling elements/nodes of the said kind, in which the at least one coupling for an outgoing conveyor segment of one material handling element/node is connected directly or indirectly to an incoming conveyor segment of another material handling element/node. In this way the material handling elements/nodes have current information about the position and sequence of the conveyed objects. If the controllers of the material handling elements/nodes are formed by a plurality of entities of a software algorithm in a computer, then the joint vectorial coupling of the conveyed objects can be saved in particular on said computer.

In a further advantageous variant of the method a plurality of conveyed objects have the same serial number in the sorting sequence. In this way it is possible to form a plurality of groups of conveyed objects arranged in a sorting sequence, in which the conveyed objects can be arranged unordered. This means that the conveyed objects do not necessarily have a clear serial number. For example, the sorting sequence can comprise a plurality of conveyed objects with the serial number 3. Said conveyed objects are arranged by means of the proposed method after group 2 but before group 4. In group 3 however the arrangement of the conveyed objects is random. This is advantageous if a plurality of similar objects (e.g. water bottles) need to be grouped in a conveyed stream in a specific position but the position of a specific object within this group is irrelevant.

It is particularly advantageous if at least the methods steps, which are assigned to a decision about the release of a conveyed object, apart from the consideration of the vectorial coupling are executed independently of all other material handling elements/nodes and/or independently of a central controller. In this way the communication and thus the use of communication lines between material handling elements can be minimized.

It is also particularly advantageous if a program logic relating to the release of a conveyed object in all material handling elements/nodes is identical, or if the methods steps are performed in an identical manner with respect to the release of a conveyed object in all material handling elements/nodes. In this way, the effort of producing or programming the controller for a conveyor system can be minimized overall, as the latter is made up of a plurality of identical modules. It is thus also possible to minimize the cost of any possible errors.

Furthermore, a method for operating a conveyor system of the said kind with an upstream storage with storage spaces for conveyed objects is advantageous in which the material handling element is designed as a robot for removing goods from storage. As already mentioned such robots, which are designed for example as storage and retrieval machines, autonomous conveying vehicles ("shuttles"), lifts or paternosters, can concentrate conveyed streams of several incoming conveyor segments to one node. For example, a storage and retrieval machine can be considered as a v-to-w-multiplexer, wherein v is the number of storage spaces reached by the storage and retrieval machine and w is the number of objects transported simultaneously by the storage and retrieval machine.

A method for operating a conveyor system of the said kind with an upstream storage with storage spaces for conveyed objects is advantageous, in which conveyed objects are removed from storage in order with respect to the destinations and with regard to a sorting sequence for a destination to be supplied. This means that firstly conveyed objects for the destination are removed from storage with the lowest position in a sequence, then the conveyed objects with the second lowest position etc. In addition, the conveyed objects for a specific destination are also removed from storage in an ordered manner. If the storage, from which goods are removed by means of a material handling element, contains for example the conveyed objects 3 and 5 of the destination A and the conveyed objects 1 and 7 of the destination B, thus the conveyed objects are removed from storage in the sequence A3, A5, B1, B7. In this example it is assumed that the missing conveyed objects in the sequence (e.g. A1, A2, A4, B2, B3, etc.) are located in other storages which are removed from storage by other material handling elements. In this way there can be overall a higher degree of ordering of the conveyed streams on the conveying technology.

However, it is also advantageous if conveyed objects are ordered with regard to a sorting sequence for a destination to be supplied, but with regard to the destinations are removed from the storage chaotically or not necessarily in any order. With regard to the previously mentioned example this means for example that the conveyed objects can also be removed from storage in the sequence B1, A3, A5, B7 or for example also in the sequence B1, A3, B7, A5. By means of the unordered removal from storage at the destination level the throughput can be increased during the removal from storage, for example if transport paths are minimized during the removal from storage.

It is also advantageous if at least two material handling elements are connected to one another directly or indirectly in the form of a ring, or if at least one part conveying flow is guided annularly over the said material handling elements. In other words, in the network of connected material handling elements a feedback route is provided. For this purpose at least one outgoing conveyor segment of at least one material handling element is connected to at least one incoming conveyor segment of at least one other, upstream material handling element. In this way the ordering level of the transported conveyed objects can be increased in several runs, or gaps can be filled in step-by-step in the sequence. It should be noted at this point that the terms "downstream" and "upstream" can be used synonymously in relation of an annular partial flow.

In a further advantageous variant of the method the releases per unit of time are monitored by a superordinate controller, and the holding device is released at which the conveyed object with the lowest serial number is waiting, if for the releases per unit of time a threshold is not met. This prevents a disadvantageous arrangement of the conveyed objects on the conveyor system causing longer blockages. Instead of releasing the conveyed object with the lowest serial number, the release can also be performed chaotically or randomly for example. Advantageously this variant of the method is combined with a buffer, sequencer, alternative route or feedback route or diversification downstream of the node in the conveyed stream, in order to produce the desired degree of ordering of the conveyed objects transported on the conveyor system. It is also advantageous if the threshold is adapted to the number of objects located on the conveyor system. This means that the threshold is increased if the number of transported objects increases and vice versa. This prevents a decreasing number of releases, caused by a small number of transported conveyed objects, being misinterpreted as a blockage. For example, such a situation may occur when starting an order picking job or for example when this is almost complete. In both cases there are comparatively few objects on the conveyor system because they are mostly still in the storage or have already been loaded into shipping containers. It is also advantageous if an interruption to the removal of conveyed objects at a destination is taken into account. Particularly in the case of manual order picking there are interruptions in the work sequence, for example when the worker takes a break or goes to the bathroom. In this case there may also be a decrease in the number of releases per unit of time which is not the result of a blockage.

In a further advantageous variant of the method the releases per unit of time to the destination to be supplied are monitored by a superordinate controller and the particular holding device is released at which the conveyed object with the lowest serial number of the relevant destination is waiting, if a threshold is not met for the releases per unit of time assigned to the relevant destination. The above explanation of the previously disclosed variant applies by analogy to this variant. However here the releases are not taken into account globally, but rather separately per destination.

It should be noted at this point that the variants disclosed of the method according to the invention and the advantages resulting therefrom relate to the material handling element and/or the conveyor system according to the invention and vice versa.

BRIEF DESCRIPTION OF THE DRAWINGS

For a better understanding of the invention the latter is explained in more detail with reference to the following figures.

In a much simplified, schematic representation:

FIG. 14 shows the vectorial coupling of FIG. 12 after the first node has been passed by one of the two conveyed objects;

FIG. 15 shows the physical arrangement of the conveyed objects assigned to the vectorial coupling of FIG. 14 in the area of the first material handling element/node;

FIG. 16 shows the vectorial coupling at a later time point with two marked conveyed objects, which are waiting at a second, downstream material handling element/node;

FIG. 17 shows the physical arrangement of the conveyed objects assigned to the vectorial coupling of FIG. 16 in the area of the second material handling element/node;

FIG. 22 shows the vectorial coupling of FIG. 20 once the third node has been passed by one of the waiting conveyed objects and in the vectorial coupling a ring is formed with a constant sense of direction;

FIG. 23 shows the physical arrangement of the conveyed objects assigned to the vectorial coupling of FIG. 22 in the area of the third material handling element/node;

FIG. 24 shows the vectorial coupling of FIG. 20 after the third node has been passed by one of the waiting conveyed objects, without producing a ring in the vectorial coupling with a constant sense of direction;

FIG. 25 shows the physical arrangement of the conveyed objects assigned to the vectorial coupling of FIG. 24 in the area of the third material handling element/node;

FIG. 38 shows the vectorial coupling of FIG. 34, after the merging node has been passed by all conveyed objects and the sorting sequence has been corrected;

FIG. 39 shows the physical arrangement of the conveyed objects assigned to the vectorial coupling of FIG. 38 in the area of the material handling element/node;

FIG. 40 shows an example of a vectorial coupling with a plurality of conveyed objects with the same serial number;

FIG. 41 shows the physical arrangement of the conveyed objects assigned to the vectorial coupling of FIG. 40 in the area of the material handling element/node;

DETAILED DESCRIPTION OF THE PREFERRED EMBODIMENTS

Figure 1:
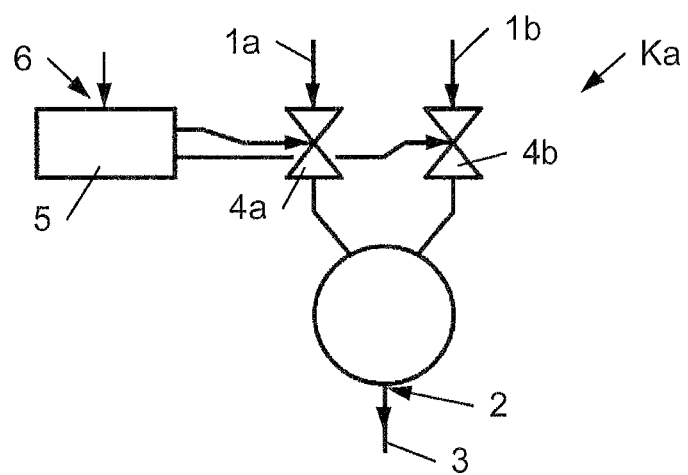
FIG. 1 shows a first schematically represented example of a material handling element/node.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

FIG. 1 shows a first example of a material handling element Ka for bundling conveyed streams. The material handling element Ka comprises two incoming conveyor segments 1a, 1b, a coupling 2 for an outgoing conveyor segment 3, to which the incoming conveyor segments 1a, 1b are merged and a plurality of holding devices 4a, 4b for halting a flow on the incoming conveyor segments 1a, 1b. Due to the said merging the material handling element Ka can also be interpreted as a node. In addition, the material handling element Ka comprises a controller 5, which is connected on the output side to the said holding devices 4a, 4b. At one input 6 the controller 5 is optionally connected to a superordinate central controller, as shown in FIG. 1 by an input-side arrow.

In the example shown in FIG. 1 only two incoming conveyor segments 1a, 1b are provided. Of course it is also possible that more than two incoming conveyor segments 1a, 1b are provided. It is also possible that unlike the representation of FIG. 1 more than one coupling 2 and more than one outgoing conveyor segment 3 are provided. It is also possible that the controller comprises additional inputs for processing signals of further controllers in particular of further controllers 5 of further nodes K.

It should also be mentioned at this point that FIG. 1 is simply a symbolic representation of the material handling element Ka. For example, the holding devices 4a, 4b are shown as valves. Of course, this should not be considered to be restrictive but any elements for halting a conveyed streams can be used as holding devices 4a, 4b. For example this can include barriers or gates which can be pushed or inserted into the conveyed stream. A holding device 4a, 4b can also consist of conveyor belts, conveyor chains, conveyor rollers and the like, which can be halted. As said conveying means are generally used both for conveying and also for halting conveyed objects 17, in this case it is difficult or impossible to make a clear distinction between the holding devices 4a, 4b and the incoming conveyor segments 1a, 1b. The incoming conveyor segment 1a, 1b therefore has a double function in this case.

It is also possible that—unlike the representation of FIG. 1—a holding device 4a, 4b is not assigned to all incoming conveyor segments 1a, 1b. For example the holding device 4b can be omitted, so that an incoming conveyed object 17 to the conveyor segment 1b is always conveyed or prioritized.

Figure 2:
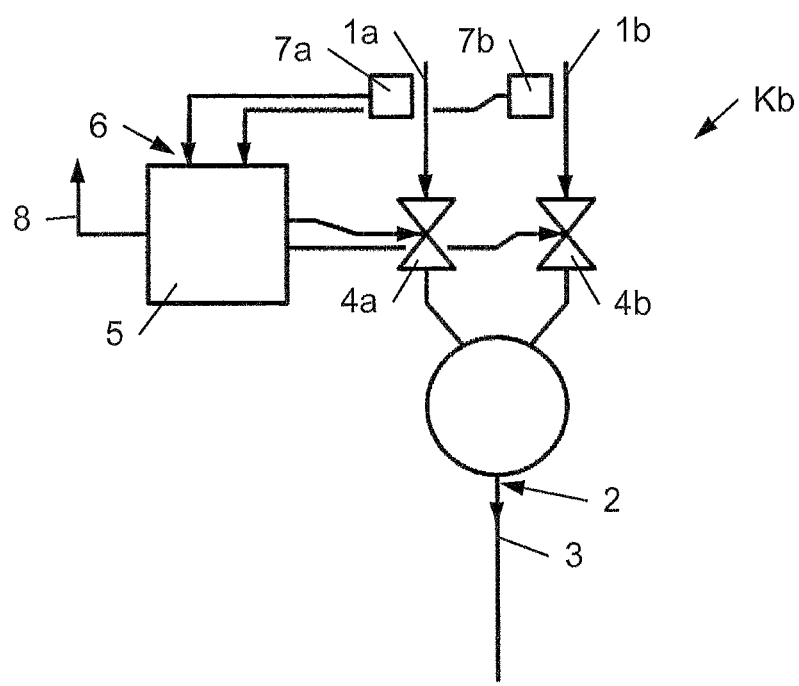
FIG. 2 as FIG. 1, but with sensors/reading devices in the incoming conveyor segments.

FIG. 2 shows a further example of a material handling element Kb, which illustrates in particular that the controller 5 is not restricted to the control of the holding device 4a, 4b, but can also take on other tasks. In FIG. 2 the controller 5 is connected to sensors and/or reading devices 7a, 7b, by means of which the incoming conveyed objects 17 to the conveyor segments 1a, 1b can be identified and their current rank or current position in a sorting sequence can be determined. Furthermore, the starting line 8 indicates that the said detection of an incoming conveyed object 17 can also be communicated to other material handling elements Ka, Kb or also to a superordinate controller.

In general a "material handling element" or "node" can be defined as any device for conveying and/or manipulating conveyed objects 17, which merges conveyed streams and transports them further via an outgoing conveyor segment or a plurality of such segments. For example this is clear from FIGS. 1 and 2 for channelers, confluences from secondary conveyor belts into a main conveyor belt and turntables. Material handling elements, which merge together conveyed streams can also be formed for example by robots for unloading conveyed objects 17 from a storage.

Figure 3:
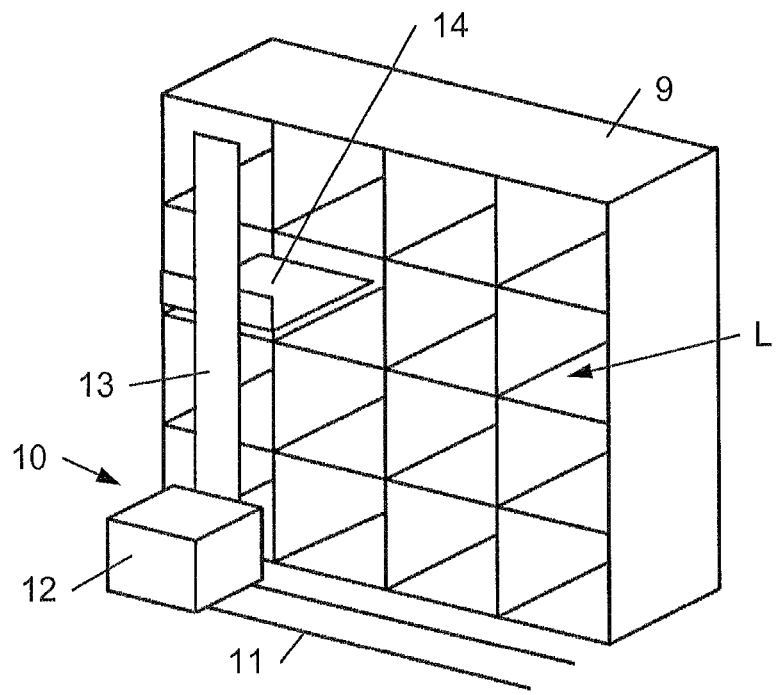
FIG. 3 shows a schematically depicted warehouse and storage and retrieval machine in perspective view.

FIG. 3 shows an example of an arrangement comprising a storage 9 with a plurality of storage spaces L and a storage and retrieval machine 10, which comprises a car 12 running on rails 11 with a lifting platform 14 running vertically on a mast 13. The function of a storage and retrieval machine 10, which here functions as an unloading robot for the storage 9, is known per se and therefore does not need to be explained in detail at this point.

Figure 4:
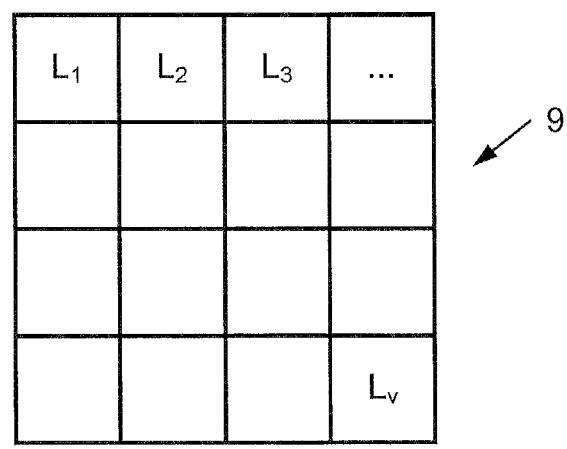
FIG. 4 shows the storage of FIG. 3 in front view.

FIG. 4 shows a schematic front view of the storage 9, showing a possible numbering of the storage spaces L1 . . . Lv.

Figure 5:
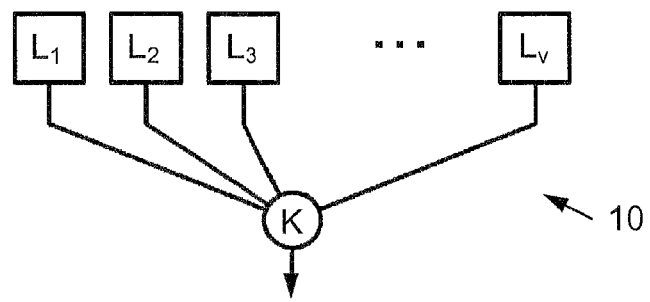
FIG. 5 shows a logical representation of the storage and retrieval machine of FIG. 3.

FIG. 5 now shows a logical or symbolic representation of the storage and retrieval machine 10 shown in FIG. 3. From FIG. 5 it can be seen that a number of incoming conveyor segments 2 corresponding to the number v of storage spaces L1 . . . Lv is concentrated on an outgoing conveyor segment 3. The concentration of the conveyed stream is thereby formed by the lifting platform 14, which in this example can hold only one conveyed object 17 respectively. The storage and retrieval machine 10 can thus be regarded as a v-to-1-multiplexer.

Figure 6:
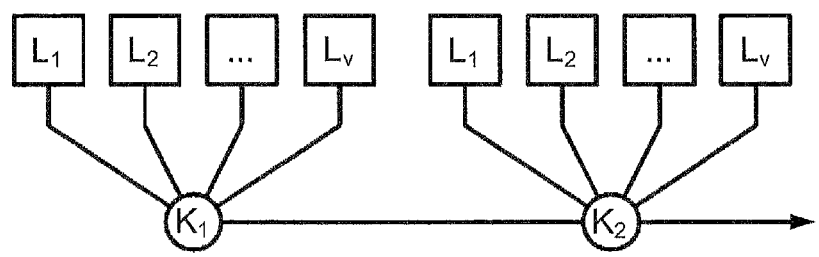
FIG. 6 shows a logical representation of a storage and retrieval machine, which can receive several conveyed objects at the same time.

It is also possible that the lifting platform 14 can hold several conveyed objects 17 at the same time. A logical representation of a storage and retrieval machine 10 with a lifting platform 14 holding two conveyed objects 17 is shown in FIG. 6. Each of the storage positions thereby forms a logical node K1, K2. In this specific example it is assumed that the conveyed objects 17 are transported away to the right. This means that the object located at the node K1 can be transported away first, when the object transported via the node K2 has left the lifting platform 14. For this reason the output from the node K1 is guided as an input to node K2. Of course, other arrangements are also possible in which the conveyed objects 17 can leave the lifting platform 14 at the same time and the nodes K1, K2 are thus not linked in the shown manner. In general, a storage and retrieval machine can be regarded as a v-to-w multiplexer, wherein v is the number of storage spaces L1 . . . Lv reached by the storage and retrieval machine 10 and w is the number of objects transported simultaneously from the storage and retrieval machine 10 or storage positions provided on the lifting platform 14. From FIGS. 5 and 6 it is also shown in particular that the conveyor segments can also be seen in general as logical conveyor segments and should not necessarily be regarded purely in physical terms. In the case of a v-to-1 storage and retrieval machine at any one time point "there is" always only one incoming conveyor segment 1a, 1b.

Figure 7:
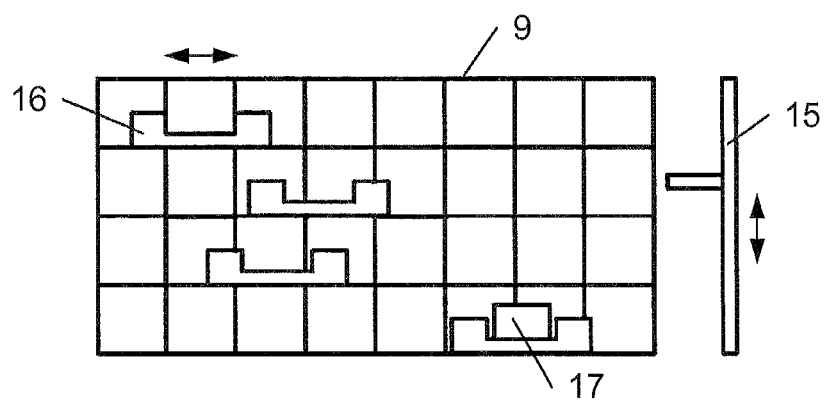
FIG. 7 shows a storage with a lift connected to the latter and with autonomously driving conveyor vehicles.
Figure 8:
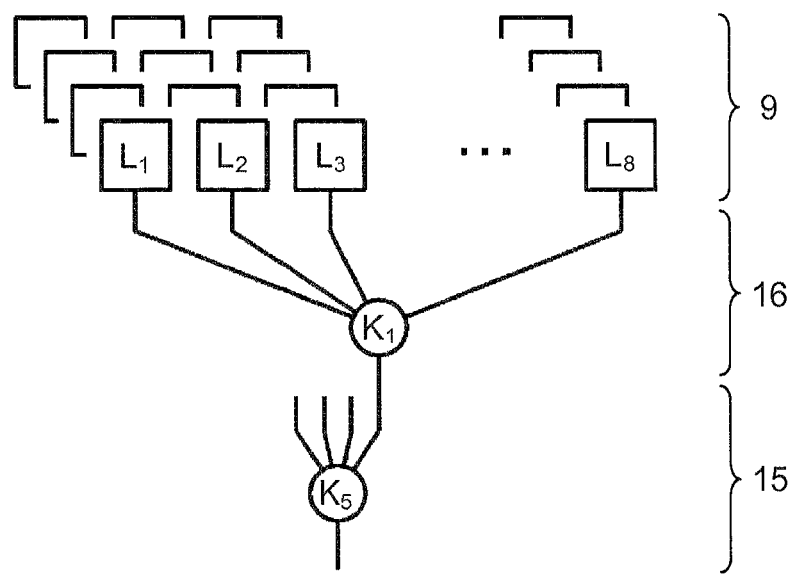
FIG. 8 shows a logical representation of the arrangement of FIG. 7.

FIG. 7 shows a further example of an arrangement comprising a storage 9, a lift 15 arranged next to the storage 9 and a plurality of autonomous conveyor vehicles 16 ("shuttles") operating on the individual storage levels. Such a shuttle 16, or such a removal robot removes a conveyed object 17 from a storage space L and transports it to the lift 15. The latter picks up the conveyed object 17 and transports it to a conveyor belt for further transport (not shown). The logical structure resulting from FIG. 7 is shown in FIG. 8. Here each shuttle 16 forms a node K1 . . . K4, to which the storage spaces L1 . . . L8 of a storage aisle are guided. The conveyor segments 3 coming from node K1 . . . K4 are guided in turn to the node K5 which represents the lift 15.

Figure 9:
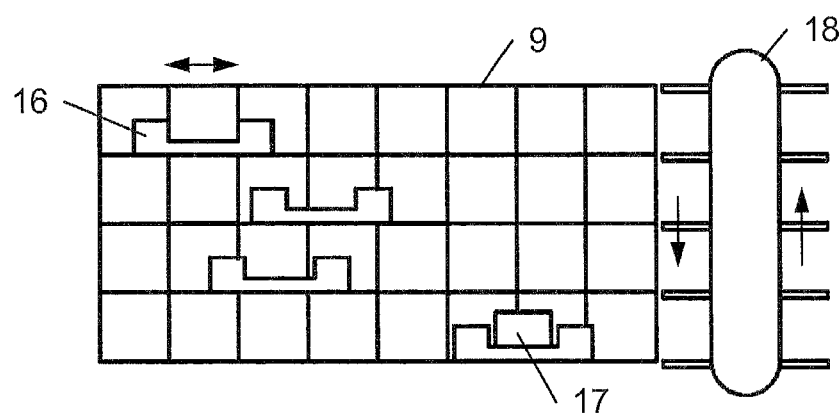
FIG. 9 as shown in FIG. 7, but with a paternoster instead of the lift.

FIG. 9 shows another arrangement comprising a storage 9 and shuttles 16, which is very similar to the arrangement shown in FIG. 7. The difference is that a paternoster 18 is provided instead of the lift 15.

Figure 10:
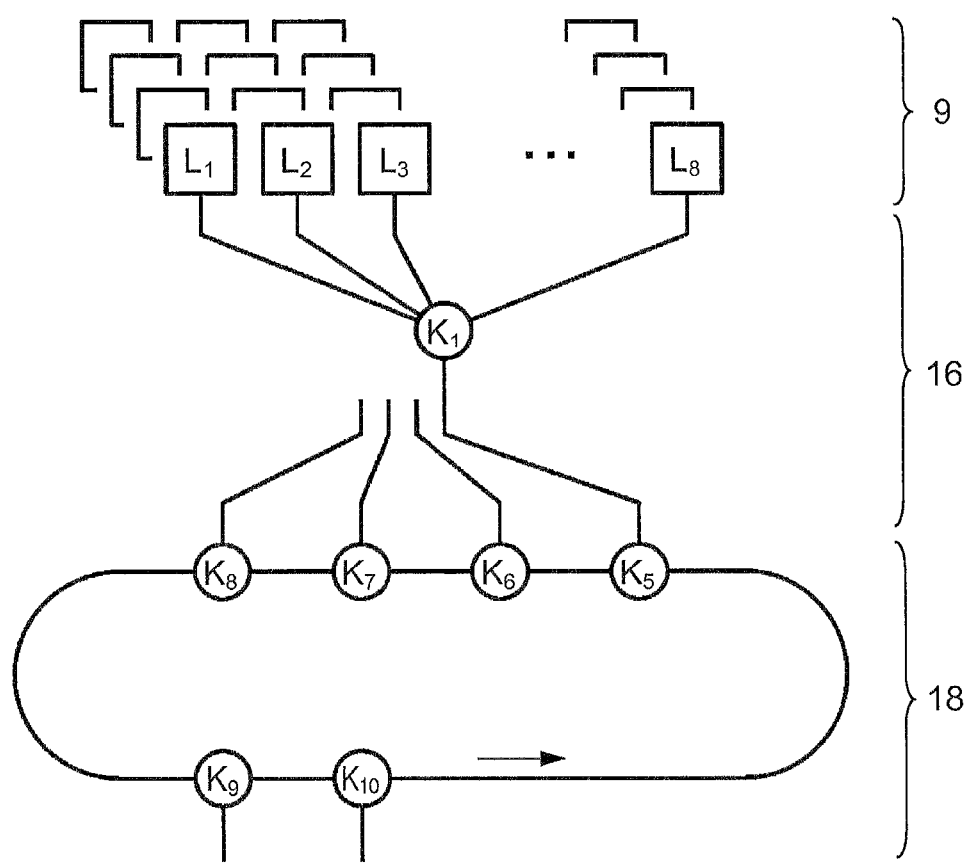
FIG. 10 shows a logical representation of the arrangement of FIG. 9.

FIG. 10 shows a logical representation of the arrangement shown in FIG. 9. Under the condition that the paternoster 18 can transport the conveyed objects 17 in a circle, the latter is shown in FIG. 10 as a loop, wherein the nodes K5 . . . K8 form the transfer points to the individual levels of the storage 9 and the nodes K9 and K10 form two removal tracks, which can be arranged (physically) next to one another for example or can also be arranged above one another.

The controller 5 is generally configured to vectorially link, according to their actual sequence in ascending/descending order, conveyed objects 17 with different target sorting sequences, which are linked vectorially according to their respective target sorting sequence in ascending/descending order and which pass the material handling element/node Ka, Kb, K1 . . . K10, and to release conveyed objects 17 waiting at a material handling element/node Ka, Kb, K1 . . . K10 in such a sequence, which avoids the formation of a ring with a constant sense of direction of the vectorial coupling.

Figure 11:
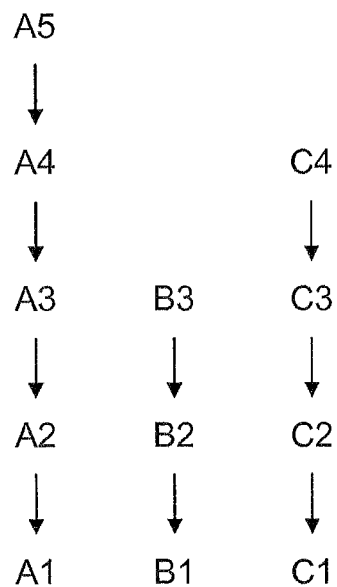
FIG. 11 shows an example of a vectorial coupling with three target sorting sequences.

The method implemented by the controller 5 is explained in more detail in the following by means of an example:

In a first step the conveyed objects 17 are linked vectorially according to a target sorting sequence in ascending/descending order. In the example it is assumed that three destinations are supplied with conveyed objects 17 and accordingly three target sorting sequences A1 . . . A5, B1 . . . B3 and C1 . . . C4 are formed. This means that at a first destination the conveyed objects 17 should arrive in the sequence A1, A2, A3, A4, A5, at a second destination in a sequence B1, B2, B3 and at a third destination in a sequence C1, C2, C3, C4. The corresponding target sorting sequence or its vectorial coupling is represented in FIG. 11. The object A2 points to object A1, object A3 points to object A2 and so on. This means that an object in this example points to the directly preceding object. In general the vectorial coupling can be saved in a memory of the controller 5 and/or a superordinate controller. The vectorial coupling can be performed in the memory directly by pointers/indicators.

Figure 12:
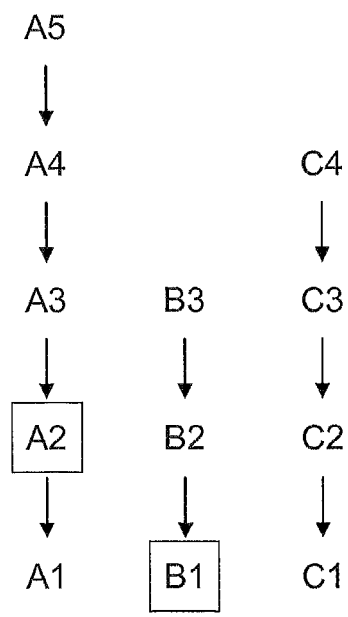
FIG. 12 shows the vectorial coupling from FIG. 11 at a later time point with two marked conveyed objects, which have been stopped at a first material handling element/node.
Figure 13:
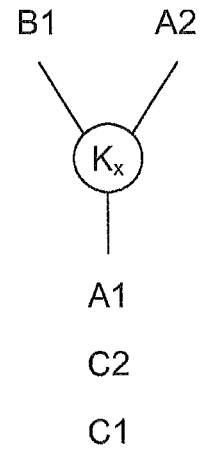
FIG. 13 shows the physical arrangement of conveyed objects assigned to the vectorial coupling of FIG. 12 in the area of the first material handling element/node.

The FIGS. 12 and 13 show the state at a node Kx at a specific time point. FIG. 12 thereby shows the vectorial link, FIG. 13 shows the physical arrangement of several conveyed objects 17 at a node Kx. In particular, it is assumed in this example that the objects C1, C2 and A1 have already passed the node Kx and the objects B1 and A2 are stopped at the node Kx. In the vectorial coupling these two objects B1 and A2 are marked with a frame.

According to the proposed method the conveyed objects 17 of different target sorting sequences, which pass the material handling element/node Ka . . . Kx, K1 . . . K10, are linked vectorially according their actual sequence in ascending/descending order.

For example it is assumed that the object B1 is released and thus a vectorial coupling is added. This situation is shown in FIGS. 14 and 15. The object B1 has already passed node Kx at this time point and it is entered into the vectorial coupling that object A2 follows object B1 or object B1 follows object A2.

It should be noted at this point that the vectorial couplings of the conveyed objects 17 with serial numbers C1, C2, A1 are not shown in the figures to give a better overview. In a real sequence however their dependencies according to their actual sequence should be included in the vectorial coupling.

FIGS. 16 and 17 now show a state at a node Ky downstream of node Kx at a later time point. The objects originating from node Kx thereby arrive at the left branch of node Ky. It is now assumed that the objects C1, C2, A1 have already passed node Ky and the objects B1, A2 are also waiting at node Ky. In addition, object C3 is waiting on the right branch. The objects B1, C3 are therefore marked with a frame in the vectorial coupling.

Figure 18:
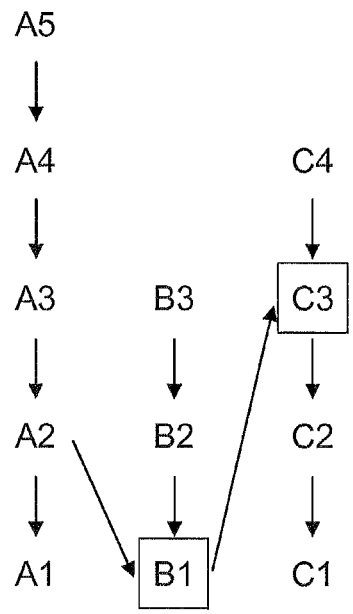
FIG. 18 shows the vectorial coupling of FIG. 16 after the second node has been passed by one of the waiting conveyed objects.
Figure 19:
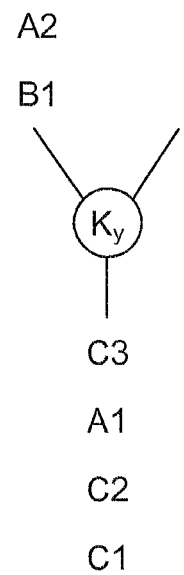
FIG. 19 shows the physical arrangement of the conveyed objects assigned to the vectorial coupling of FIG. 18 in the area of the second material handling element/node.

It is also assumed that the object C3 passes node Ky next. This state is illustrated in FIGS. 18 and 19. Specifically the link is supplemented by a vector, therefore object B1 follows object C3, or object C3 precedes object B1.

The FIGS. 20 and 21 also show a situation at node Kz downstream of node Ky at a later time point. The objects coming from node Ky thereby enter the left branch of node Kz. It is assumed that object C1 has already passed node Kz and objects C2, A1, C3, B1, A2 continue to wait at node Kz. In addition, object A3 is waiting on the right branch of node Kz. The objects C2, A3 are therefore marked with a frame in the vectorial coupling.

According to the proposed method conveyed objects 17 waiting at a material handling element/node Ka . . . Kz, K1 . . . K10 are released in such a sequence which avoids forming a ring with a constant sense of direction of the vectorial coupling.

FIGS. 22 and 23 show a situation in which such a ring is formed. This occurs specifically in that the object A3 passes the node Kz before the object C2. In the vectorial coupling thus a vector is shown in which object C2 follows object A3, or object A3 precedes object C2. In FIG. 23 a situation is shown in which also objects A1, C3, B1, A2 have passed the node Kz. It is particularly clear from FIG. 23 that the target sorting sequence A1 . . . A5 can no longer be produced without further measures (see below), as object A3 precedes object A1.

According to the proposed method the formation of such a ring is avoided. This is achieved in that the holding devices 4a, 4b are controlled so that object C2 passes node Kz before object A3. In the vectorial coupling shown in FIG. 24 thus a vector is shown, according to which object A3 follows object C2 or object C2 precedes object A3. Although a ring is formed it does not have a constant sense of direction. FIG. 25 also shows a situation in which also objects A1, C3, B1, A2 have passed the node Kz. It is particularly clear from FIG. 23 that the target sorting sequence A1 . . . A5 can then be produced when object A2 precedes object A3.

In the end a method is provided for bundling conveyed streams at a material handling element/node Ka . . . Kz, K1 . . . K10 with a plurality of incoming conveyor segments 1a, 1b, at least one coupling 2 at an outgoing conveyor segment 3, to which the incoming conveyor segments 1a, 1b are merged, and a plurality of holding devices 4a, 4b for halting conveyed objects 17 or a flow on the incoming conveyor segments 1a, 1b, wherein the conveyed objects 17 are linked vectorially according to their target sorting sequence in ascending/descending order, the conveyed objects 17 of different target sorting sequences, which pass the material handling element/node Ka . . . Kz, K1 . . . K10, are linked vectorially according to their actual sequence in ascending/descending order and conveyed objects 17 waiting at a material handling element/node Ka . . . Kz, K1 . . . K10 are released in such a sequence, which avoids the formation of a ring with a constant sense of direction of the vectorial coupling.

In particular, conveyed objects 17 waiting at a node Ka . . . Kz, K1 . . . K10 are only released in such a sequence which avoids the formation of a ring with a constant sense of direction of the vectorial coupling.

In an advantageous variant of the proposed method at least for the conveyed objects 17 waiting at the material handling element/node Ka . . . Kz, K1 . . . K10 evaluation parameters are calculated, which avoid the formation of a ring with a constant sense of direction in the vectorial coupling, the evaluation parameters are calculated a) by means of a priority of a sorting sequence, wherein higher priorities lead to greater/smaller evaluation parameters, and/or b) by means of a spatial and/or time interval between the waiting conveyed objects 17 and the preceding conveyed objects 17 in at least one sorting sequence, wherein conveyed objects downstream of the material handling element/node Ka . . . Kz, K1 . . . K10 are evaluated positively/negatively and conveyed objects 17 upstream of the material handling element/node Ka . . . Kz, K1 . . . K10 are evaluated negatively/positively and the particular conveyed object 17 is released to which the greatest/smallest evaluation parameter is assigned.

Figure 26:
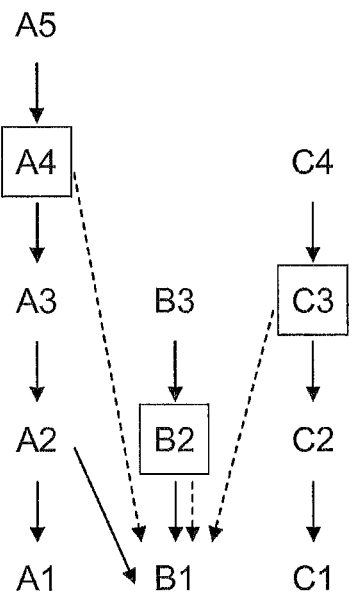
FIG. 26 shows a vectorial coupling in a situation in which three different prioritized conveyed objects are waiting at a node.
Figure 27:
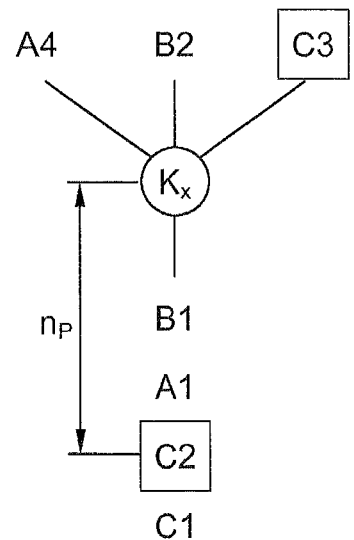
FIG. 27 shows the physical arrangement of the conveyed objects assigned to the vectorial coupling of FIG. 26 in the area of the material handling element/node.

In addition, FIGS. 26 and 27 show an example in which objects C1, C2, A1, B1 have passed node Kx and objects A4, B2 and C3 have been stopped at node Kx. The objects A4, B2 and C3 are marked with a frame in the vectorial coupling. None of the objects A4, B2 and C3 would produce a ring with a constant sense of direction in the vectorial coupling, as shown by the dashed-line vectors of A4→B1, B2→B1 and C3→B1. For the objects A4, B2 and C3 evaluation parameters are then calculated by means of the spatial distance between the waiting conveyed objects 17 and the preceding conveyed objects 17 in at least one sorting sequence (case b). In particular, the said spatial distance in this example is determined by means of the number of conveyed objects 17 which are between a waiting conveyed object 17 and the preceding conveyed object 17 in a sorting sequence. In FIG. 27 the number np (in this case np=2) is entered for the objects C3 and C2, which results in the greatest evaluation parameter of the objects A4, B2 and C3. The distance B2, B1 is shorter and distance A4, A3 is to be taken into consideration with an opposite+/−sign, as the object A3 has not yet passed the node Kx. Thus object C3 can pass first.

Figure 28:
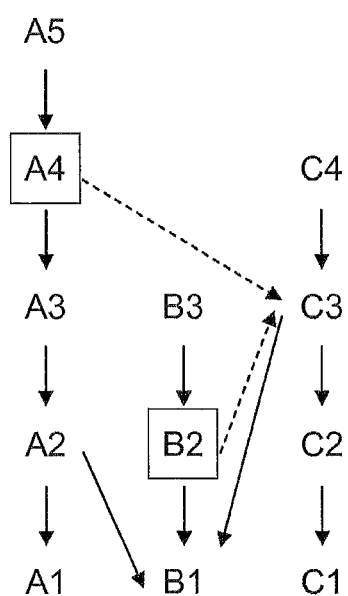
FIG. 28 shows the vectorial coupling of FIG. 26 after the node has been passed by one of the waiting conveyed objects.
Figure 29:
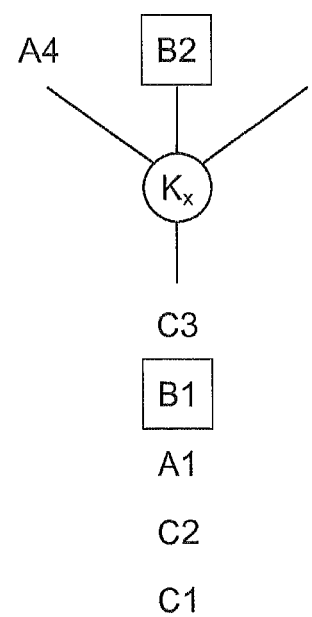
FIG. 29 shows the physical arrangement of the conveyed objects assigned to the vectorial coupling of FIG. 28 in the area of the material handling element/node.

The resulting situation is represented in FIGS. 28 and 29. The next following object is object B2, as the distance B2, B1 results in the greatest evaluation parameter.

Figure 30:
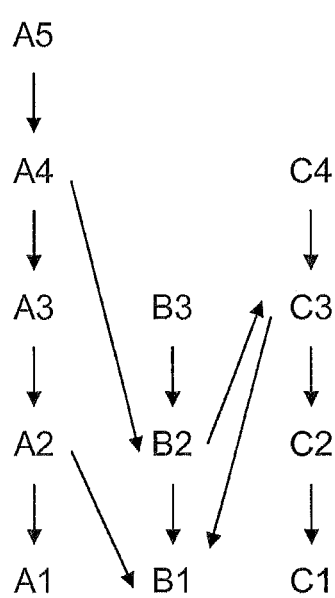
FIG. 30 shows the vectorial coupling of FIG. 26 after the node has been passed by all three conveyed objects.
Figure 31:
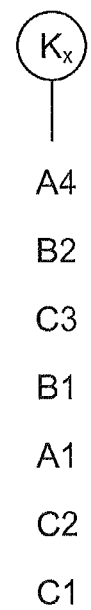
FIG. 31 shows the physical arrangement of the conveyed objects assigned to the vectorial coupling of FIG. 30 in the area of the material handling element/node.
Figure 32:
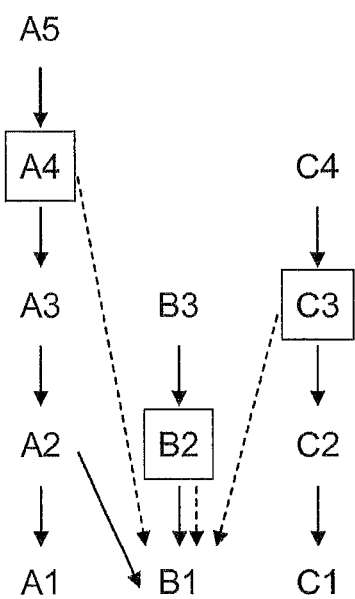
FIG. 32 similar to FIG. 26, but with another method for determining an evaluation parameter.

Object A4 follows last, as overall it is prioritized the least. The resulting situation is shown lastly in FIGS. 30 and 31.

In the above example the evaluation parameter was calculated by means of the spatial distance, specifically by means of the number np of conveyed objects 17, between the waiting conveyed objects 17 and the respective preceding conveyed objects 17 in at least one sorting sequence. This is advantageous but not the only possibility. Rather it is possible that the spatial distance is determined by means of the number nk of material handling elements/nodes Ka . . . Kz, K1 . . . K10, which are between a waiting conveyed object 17 and the preceding conveyed object 17 in a sorting sequence. In a similar variant the said spatial distance is determined by means of the number of vectors in the vectorial coupling, which are between a waiting conveyed object 17 and the preceding conveyed object 17 in a sorting sequence. It is also possible that the said spatial distance is determined by means of a (physical) length of a conveyed stream, the ends of which are between a waiting conveyed object 17 and the preceding conveyed object 17 in a sorting sequence. The length of the said conveyed stream can then be given as a unit of length, for example in meters.

Alternatively or additionally, it is also possible that the evaluation parameter is calculated by means of a time interval between the waiting conveyed objects 17 and the preceding conveyed objects 17 in at least one sorting sequence. For example, the said time interval can be determined by means of a period for running through of a conveyed stream, the ends of which are between a waiting conveyed object 17 and the preceding conveyed object 17 in a sorting sequence. The said time interval can then be given as a unit of time, for example in seconds.

Figure 33:
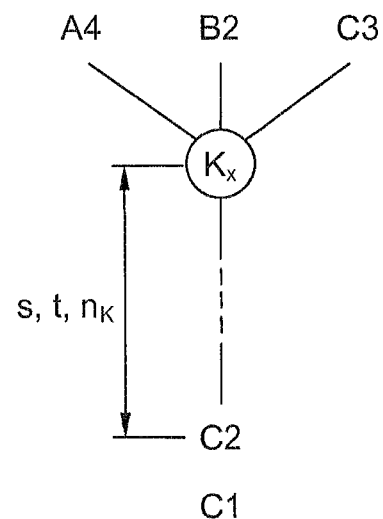
FIG. 33 similar to FIG. 27, but with another method for determining an evaluation parameter.

In FIG. 33 the spatial/time interval between the objects C2 and C3 is shown symbolically by the distance arrow s (length of a conveyed stream), t (time for running through of a conveyed stream) and nk (number of nodes).

For example in FIG. 10 it is assumed that the objects A4, B2 and C3 are halted at node K1 and the objects C1, C2, A1, B1 wait at the node K9, then to calculate the evaluation parameter the spatial distance s between node K1 and node K9 can be used, the time t that the conveyed objects 17 take to run over this distance s, or for example also the number nk of nodes between node K1 and node K9. The number nk in the present example is nk=4.

In addition to or as an alternative to the already proposed possibilities, the evaluation parameters can be calculated a) by means of a priority of a sorting sequence. For example, the processing of the sorting sequence C1 . . . C4 can be more important than the processing of the sorting sequence A1 . . . A5 and can thus be more highly prioritized.

A total evaluation parameter can be defined for example as the sum or product of the evaluation parameters determined according to case a) and case b).

In a further advantageous variant of the proposed method
- a conveyed object 17 waiting at a node Ka . . . Kz, K1 . . . K10, which forms a ring with a constant sense of direction of the vectorial coupling, if a) the assigned evaluation parameter exceeds/does not meet a threshold and if b) a space is free or becomes free in a buffer, sequencer, alternative route or feedback route or diversification downstream of the node Ka . . . Kz, K1 . . . K10, if the said conveyed object 17 arrives as planned at the buffer, the sequencer, the alternative route or the feedback route and
- the conveyed object 17 is transported therein.

Figure 34:
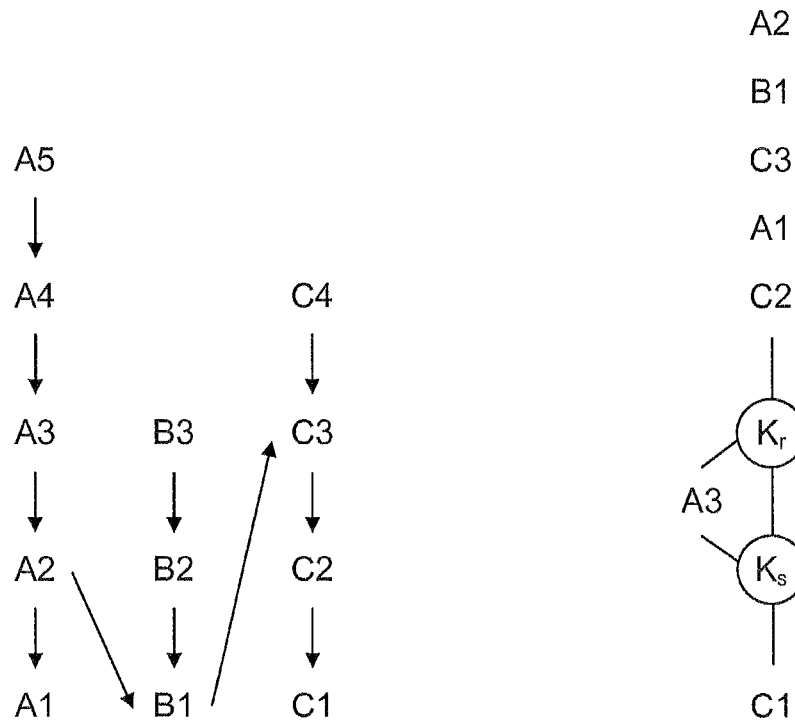
FIG. 34 shows the vectorial coupling of FIG. 22 in a situation in which the conveyed object causing an error in a sorting sequence has been transported on an alternative route.
Figure 35:
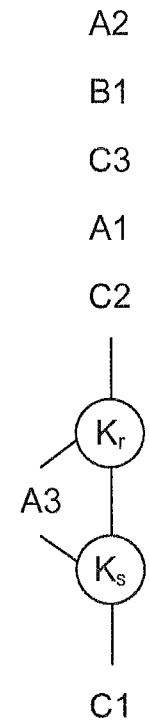
FIG. 35 shows the physical arrangement of the conveyed objects assigned to the vectorial coupling of FIG. 34 in the area of the material handling element/node.
Figure 36:
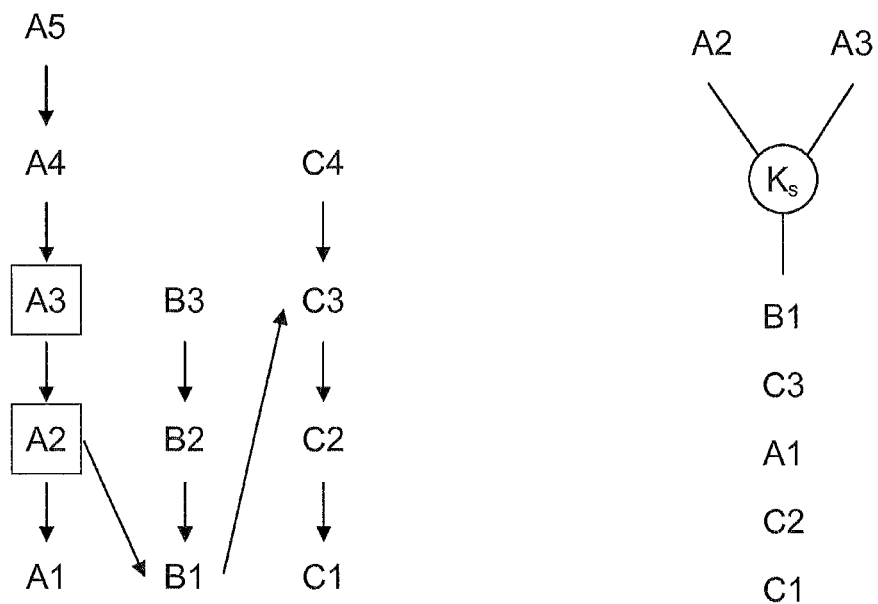
FIG. 36 shows the vectorial coupling of FIG. 34, after the merging node has been passed by several conveyed objects.
Figure 37:
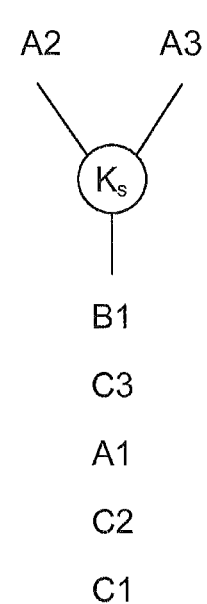
FIG. 37 shows the physical arrangement of the conveyed objects assigned to the vectorial coupling of FIG. 36 in the area of the material handling element/node.

This means that an error in the actual sequence can be allowed as an exception if the evaluation parameter for the relevant object is very high and its further transport is therefore important. For the purpose of illustrating the proposed method FIGS. 34 and 35 show the correction of the sequence shown in FIGS. 22 and 23. For this purpose the object forming the ring in the vectorial coupling (cf. FIG. 22) is ejected from the conveyed stream and reintroduced at a later time point. In FIG. 35 the object A3 at node Kr is therefore directed into a left branch and halted at node Ks, whereas the objects C2, A1, C3, B1 are guided directly through the nodes Kr and Ks. At a following time point thus the objects A2 and A3 wait at node Ks (cf. FIGS. 36 and 37). Whereas the sequence A3 before A2 would form a ring with a constant sense of direction in the vectorial coupling, such a ring is avoided by the sequence A2 before A3.

The vector C2→A3 was already deleted previously from the vectorial coupling, when the conveyed object 17 with serial number A3 was transported into the alternative route (alternatively into a buffer, a sequencer or feedback route). Alternatively also the entry of the vector C2→A3 in FIG. 22 can be omitted if the object A3 is marked as an unsorted object and is then directed at node Kr into the alternative route. Overall in FIG. 38 a vectorial coupling is formed without a ring with a constant sense of direction. FIG. 39 also shows a correct sequence of the objects A1, A2, A3 according to the preceding target sequence.

The FIGS. 40 and 41 show a situation, in which a plurality of conveyed objects 17 have the same serial number in the sorting sequence. In particular, two objects A2 and two objects C1 are provided. This procedure is useful if a plurality of similar objects are supposed to arrive at a specific position at the destination. For example, the objects A2 can be a plurality of similar water bottles, whereby it is not important which water bottle is arranged in which of several possible positions for water bottles.

Figure 20:
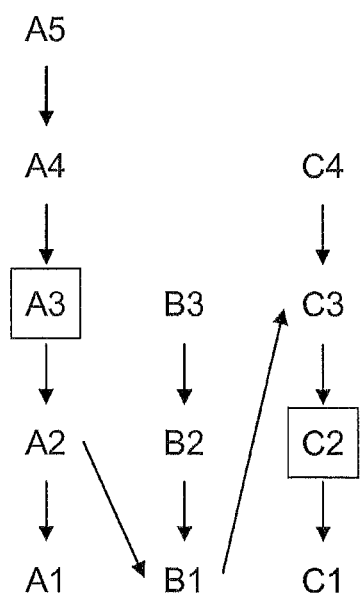
FIG. 20 shows the vectorial coupling at a later time point with two marked conveyed objects, which are waiting at a third, downstream material handling element/node.
Figure 21:
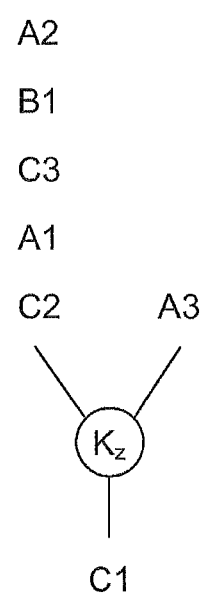
FIG. 21 shows the physical arrangement of the conveyed objects assigned to the vectorial coupling of FIG. 20 in the area of the third material handling element/node.

The FIGS. 40 and 41 show a situation, which is comparable to the situation shown in FIGS. 20 to 21. FIGS. 40 and 41 show a state, in which the objects coming from node Ky have arrived at the left branch of the node Kz. It is now assumed that object C1 has already passed the node Kz and a further object C1 and objects A1, C2, B1, A2 are still waiting at node Kz. In addition, in the right branch of the node Kz there is a further object A2. The objects C1, A2 are therefore marked with a frame in the vectorial coupling.

There are now several ways of entering the vector C1→A2 into the vectorial coupling. All options result— provided that object A2 is released before object C1—in a closed ring with a constant sense of direction. FIG. 40 therefore one of the rings is shown by thick lines. However, also other possible vectors, which are indicated by dotted lines, dashed lines and dash-dotted lines, can result in said ring—as can be easily understood. Thus object C1 has to be released before object A2 in order to achieve the target sorting sequences. Unless a space is used in a buffer, sequencer, alternative route or feedback route arranged downstream of the node Kz (cf. FIGS. 34 and 35).

Figure 42:
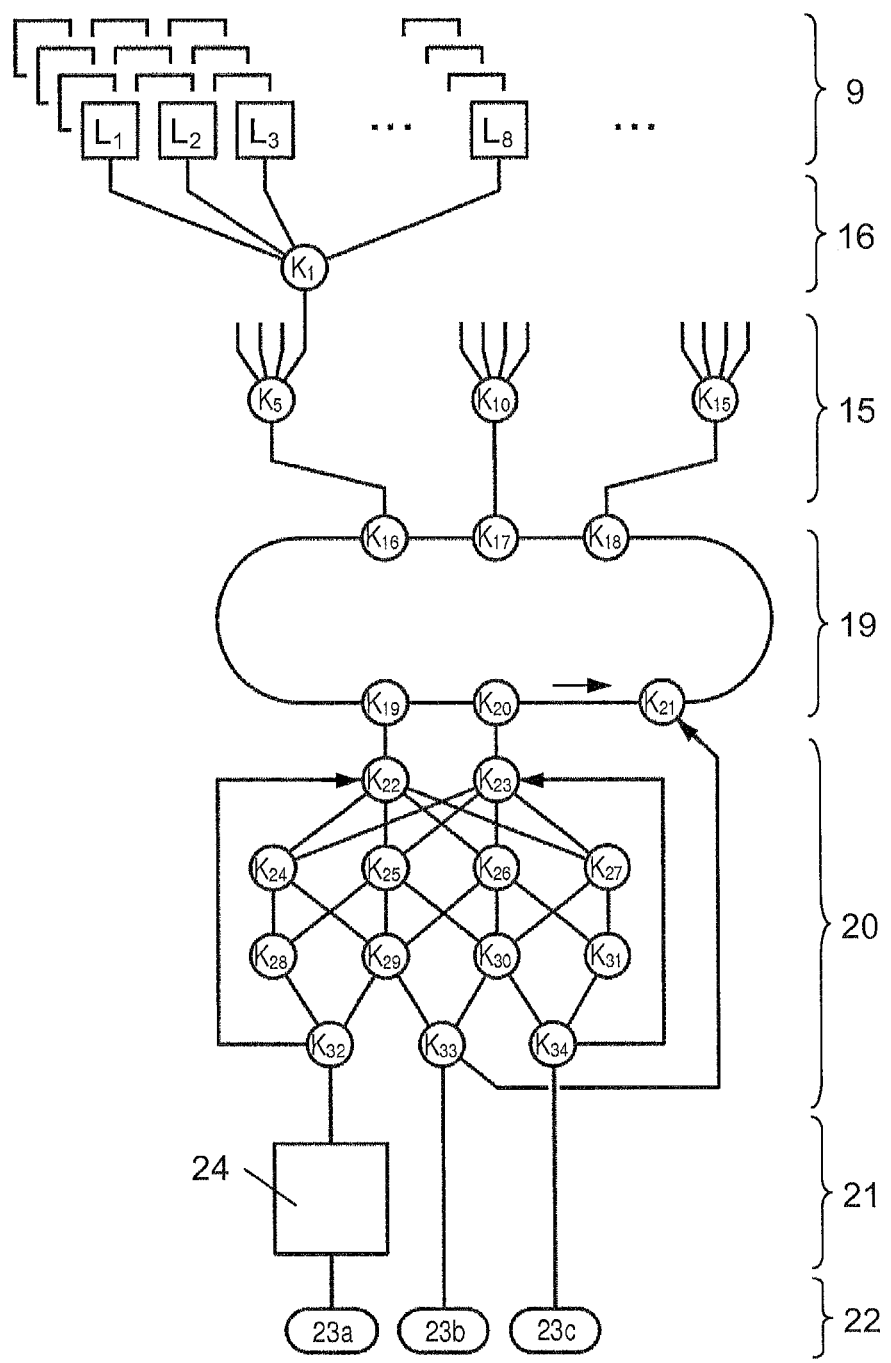
FIG. 42 shows an example of a slightly more complex conveyor system.

FIG. 42 now shows in addition a slightly more complex example of a conveyor system. As in FIGS. 5, 6, 8 and 10 a plurality of material handling elements Ka, Kb are coupled together such that at least one coupling 2 for an outgoing conveyor segment 3 of one material handling element Ka, Kb is connected directly or indirectly to an incoming conveyor segment 1a, 1b of a different material handling element Ka, Kb. As also already shown in FIGS. 5, 6, 8 and 10 the material handling elements or nodes K1 . . . K34 are only represented in simple form.

In the above connection "directly" means that the coupling 2 for an outgoing conveyor segment 3 of a material handling element Ka, Kb is connected without the interconnection of other elements to an incoming conveyor segment 1a, 1b of another material handling element Ka, Kb. For example this relates in FIG. 42 to nodes K5 and K16. "Indirectly" means that other elements are connected in between, in particular other branches and the like. For example the connection of nodes K16 and K24 is indirect, as K19 and K22 are connected in between and act as a divergence.

In particular, the arrangement shown in FIG. 42 comprises a storage 9, a plurality of shuttles 16 operating autonomously therein and lifts 15 connected to the storage 9. In this example the storage 9 has three rows of shelves or aisles, wherein each aisle 32 has storage spaces L which are arranged on four levels with eight places in each. Thus the shuttles 16 representing the nodes K1 . . . K4 move in the first aisle, the shuttles 16 representing the node K6 . . . K9 move in the second aisle and the shuttles 16 representing the nodes K11 . . . K14 move in the third aisle. The lifts 15 are represented by the nodes K5, K10 and K15.

There is a horizontal loop 19 adjoining the lifts 15, in which nodes K16 . . . K21 are arranged. The arrow denotes the conveying direction. Via nodes K19 and K20 conveyed objects 17 are transferred from the loop 19 into a network 20 which comprises a plurality of interconnected nodes K22 . . . K34. An optional sorting area 21 adjoins the network 20 and an order picking area 22 adjoins the latter. In the order picking area 22 there are three destinations 23a . . . 23c to be supplied, for example workstations, at which conveyed objects 17 are loaded automatically or manually into shipping containers or onto pallets. In the example shown in FIG. 42 a sorting stage 24 is only upstream of one destination 23a. It would also be possible to arrange a sorting stage 24 upstream of each destination 23a . . . 23c or also none.

In the example shown in FIG. 42 a plurality of material handling elements/nodes K1 . . . K34 are connected to one another directly or indirectly in a ring. Thus at least one partial flow is guided in a ring over the said material handling elements/nodes K1 . . . K34. In other words, a feedback route is provided. For example node K21 is connected in a ring to node K18, node K32 is connected to node K22, node K34 is connected to node K23 and node K33 is connected to node K21. In this way it is possible to increase the level of ordering of the transported conveyed objects 17 in several pass-throughs, or gaps can be filled in the sequence step-by-step. The terms "downstream" and "upstream" can be used synonymously with reference to such an annular partial flow. Of course, the feedback routes shown in FIG. 42 are given purely by way of example and are used to illustrate the possibilities more effectively. Other ring-like connections are of course also possible.

FIG. 42 shows several divergences of the conveyed stream, for example at the nodes K22 . . . K31. In general a divergence can be used to direct an outgoing conveyed stream in various areas of a conveyor system or to different destinations 23a . . . 23c. For this a node K22 . . . K31 with a plurality of outgoing conveyor segments 3 can also be divided into a node K22 . . . K31 with only one outgoing conveyor segment 3 and a downstream node with a plurality of outgoing conveyor segments 3.

It is advantageous if at least those method steps which are assigned to a decision about the release of a conveyed object 17 are carried out, apart from the consideration of the vectorial coupling, independently of all other material handling elements/nodes Ka . . . Kz, K1 . . . K34 and/or independently of a central controller. In this way the communication and thereby the cost of communication lines between the material handling elements K1 . . . K34 are minimized.

It is also an advantage in this connection if a program logic is designed to be identical in terms of the release of a conveyed object 17 in all material handling elements K1 . . . K34, or if the method steps are designed in an identical manner with respect to the release of a conveyed object 17 in all material handling elements K1 . . . K34. In this way the effort involved in producing or programming the controller for a conveyor system can be minimized overall, as the latter is made up of several identical modules. In this way the cost of any errors can also be minimized.

To form a predefined sorting sequence it is also an advantage if conveyed objects 17 are removed in an ordered form from storage with respect to the destinations 23a . . . 23c and with respect to a sorting sequence for a destination 23a . . . 23c to be supplied. This means that firstly conveyed objects 17 for the destination 23a . . . 23c with the lowest position in a sequence are removed from storage, then the conveyed objects 17 with the second lowest position etc. In addition, the conveyed objects 17 for a specific destination 23a . . . 23c are also removed from storage in an ordered manner. If in the aisle of the storage 9, from which goods are removed by the material handling elements K1 . . . K4, there are for example the conveyed objects 17 with the number 3 and number 5 of the destination 23a and the conveyed objects 17 with the number 1 and the number 7 of the destination 23b, the conveyed objects 17 can thus be removed from storage in sequence A3, A5, B1, B7. In this example it is assumed that the missing conveyed objects 17 in the sequence (e.g. A1, A2, A4, B2, B3, etc.) are located in other aisles, which are removed from storage by other material handling elements K6 . . . K9, K11 . . . K14. In this way overall a higher degree or ordering of the conveyed stream can be achieved by the conveying technology.

Alternatively, it would also be possible for the conveyed objects 17 to be ordered with respect to a sorting sequence for destination 23a . . . 23c to be supplied, with respect to the destinations 23a . . . 23c, but to be removed from the storage 9 chaotically or not in any order. With regard to the aforementioned example this means that the conveyed objects 17 can also be removed for example in the sequence B1, A3, A5, B7 or for example in the sequence B1, A3, B7, A5. By means of the unordered removal from storage at destination level the throughput of the removal can also be increased, for example if during the removal the transport movements of the material handling elements K1 . . . K15 are minimized.

If necessary, the conveyed objects 17 before reaching a destination 23a . . . 23c can still run through a sorting stage or a sequencer 24 in order to achieve an accurate actual sequence, as shown in FIG. 42 for the destination 23a. Due to the presorting said sorting stage 24 can be kept small and therefore only takes up a small amount of space.

In order identify blockages on the conveyor system or to remove the latter according to one advantageous embodiment the releases of the nodes K1 . . . K34 per unit of time are monitored by a superordinate controller and the particular holding device 4a, 4b is released at which the conveyed object 17 with the lowest serial number is waiting, if a threshold is not met for the releases per unit of time.

For example if the value for the releases per unit of time falls from a relatively constant value (e.g. 50 releases per minute) down to a very low value or even zero, it can be assumed that there is blockage on the conveyor system. Said blockage can be resolved by means of a superordinate intervention. Instead of releasing the conveyed object 17 with the lowest serial number the release can also be performed randomly for example.

It is also advantageous if the threshold is adapted according to the number of conveyed objects 17 located on the conveyor system. This means that the threshold is increased if the number of transported objects 17 increases and vice versa. In this way a decreasing number of releases caused by a low number of transported conveyed objects 17 is not misinterpreted as a blockage.

For example, a situation of this kind may occur when starting a picking order or also if the latter is almost complete. In both cases there is a comparatively small number of objects 17 on the conveyor system because they are mostly still in the storage 9 or have already been loaded into shipping containers. It is also advantageous if an interruption to the removal of the conveyed objects 17 at a destination 23a . . . 23c is taken into consideration. Particularly in the case of manual picking there are likely to be interruptions in the work process, for example when a worker takes a break or goes to the bathroom. In this case there may also be a decrease in the number of releases per unit of time which is not caused by a blockage.

In this connection it is also advantageous if the removal of conveyed objects 17 from the storage 9 is adjusted to the removal of the conveyed objects 17 at the destination 23a . . . 23c. This means that the number of conveyed objects 17 removed from the storage 9 per unit of time is lowered if the number of conveyed objects 17 removed per unit of time at the destination 23a . . . 23c falls and vice versa.

In one variant of the said method the releases per unit of time for each destination 23a . . . 23c to be supplied are monitored by a superordinate controller. Thus the holding device 4a, 4b is released at which the conveyed object 17 is waiting with the lowest serial number A1 . . . A5, B1 . . . B3, C1 . . . C4 of the relevant destination 23a . . . 23c, if for the releases per unit of time assigned to the relevant destination 23a . . . 23c a threshold is not met.

In connection with FIG. 42 it is also shown clearly how the evaluation parameter explained above can be calculated by means of a spatial and/or time interval between the waiting conveyed objects 17 and the preceding conveyed objects 17 in at least one sorting sequence (case b). Purely by way of example it is assumed that the predecessor of the conveyed object 17 waiting at node K5 is at node K22. Thus there three nodes between the two said conveyed objects 17, namely the nodes K5, K16 and K19. This can be used directly for the basis of a calculation for the evaluation parameters. Alternatively, also the route s between node K5 and node K22 can be used as the basis for calculation, or also the time t required for this. As a further alternative the evaluation parameter can be used as already mentioned by means of the number of conveyed objects 17 between node K5 and node K22.

The above calculation of the evaluation parameter is mainly suitable if the two conveyed objects 17 under consideration are transported on the same path and/or at least pass the relevant node Ka . . . K34 on their path. If this is not the case another calculation method may be more advantageous.

Specifically the evaluation parameters are then calculated by means of differences between spatial and/or time intervals nk, np, s, t, wherein a difference is defined as a spatial and/or time interval nk, np, s, t of a waiting conveyed object 17 to a destination 23a . . . 23c or downstream material handling element/node Ka . . . K34 minus a spatial and/or time interval nk, np, s, t of the preceding conveyed object 17 in a sorting sequence to said destination 23a . . . 23c or at said downstream material handling element/node Ka . . . K34.

The result of this is a method in which
at least for the conveyed objects 17 waiting at the material handling element/node Ka . . . K34 evaluation parameters can be calculated which avoid the formation of a ring with a constant sense of direction in the vectorial coupling,
the evaluation parameters are calculated a) by means of a priority of a sorting sequence, wherein higher priorities result in larger/smaller evaluation parameters, and/or b) by means of differences of spatial and/or time intervals nk, np, s, t, wherein a difference is defined as a spatial and/or time interval nk, np, s, t of a waiting conveyed object 17 to a destination 23a . . . 23c or downstream material handling element/node Ka . . . K34 minus a spatial and/or time interval nk, np, s, t of the preceding conveyed object 17s in a sorting sequence to said destination 23a . . . 23c or to said downstream material handling element/node Ka . . . K34 and
the conveyed object 17 is released to which the largest/smallest evaluation parameter is assigned.

In a specific example it is assumed that the predecessor of the conveyed objects 17 waiting at the node K5 is at node K10. Both conveyed objects 17 are assigned to the destination 23a in this example.

The said difference can be determined by means of a length s of a conveyed stream, the ends of which are between the waiting conveyed object 17 and the said destination 23a, and the length s of a conveyed stream, the ends of which are between the preceding conveyed object 17 in a sorting sequence and the said destination 23a. In the specific example the said difference is thus calculated to the distance of the conveyed object 17 to the destination 23a minus a distance of preceding conveyed object 17 to the destination 23a.

Instead of the destination 23a a downstream node Ka . . . K34 can also be used as a basis for reference. The next node passed by both conveyed objects 17 is node K16. In the specific example the said difference is calculated i.e. the distance of conveyed object 17 to node K16 minus distance of predecessor conveyed object 17 to node K16. Instead of node K16 another node Ka . . . K34 passed by both conveyed objects 17 are used, for example node K19 or node K22. The calculated result for the said difference is thus not influenced.

The calculation of the said difference can also be performed on the basis of a time interval instead of on the basis of a spatial distance. Thus the said difference in the specific example is calculated by the formula: time of conveyed object 17 to destination 23a minus time of predecessor conveyed object 17 to destination 23a or also by the formula: time of conveyed object 17 to node K16 minus time of predecessor conveyed object 17 to node K16.

By analogy the said difference can also be determined by means of the number np of conveyed objects 17, which are between the waiting conveyed object 17 and the said destination 23a or the said downstream material handling element/node Ka . . . K34, and the number np of conveyed objects 17 is determined between the preceding conveyed object 17 in a sorting sequence and the said destination 23a or said downstream material handling element/node Ka . . . K34.

The calculation of the said difference can also be determined by analogy by means of the number nk of material handling element/nodes Ka . . . K34 which are between the waiting conveyed object 17 and the said destination 23a or the said downstream material handling element/node Ka . . . K34, and the number nk of material handling elements/nodes Ka . . . K34 which are between the preceding conveyed object 17 in a sorting sequence and the said destination 23a or the said downstream material handling element/node Ka . . . K34. For the above example this difference means nk=−1. This means that the conveyed object 17 waiting at the node K5 is not yet "overdue" in the specific situation.

Lastly, the said difference can also be determined by means of the number of vectors in the vectorial coupling, which are between the waiting conveyed object 17 and the said destination 23a or the said downstream material handling element/node Ka . . . K34, and the number of vectors which are between the preceding conveyed object 17 in a sorting sequence and the destination 23a or the said downstream material handling element/node Ka . . . K34. The above applies by analogy.

Figure 43:
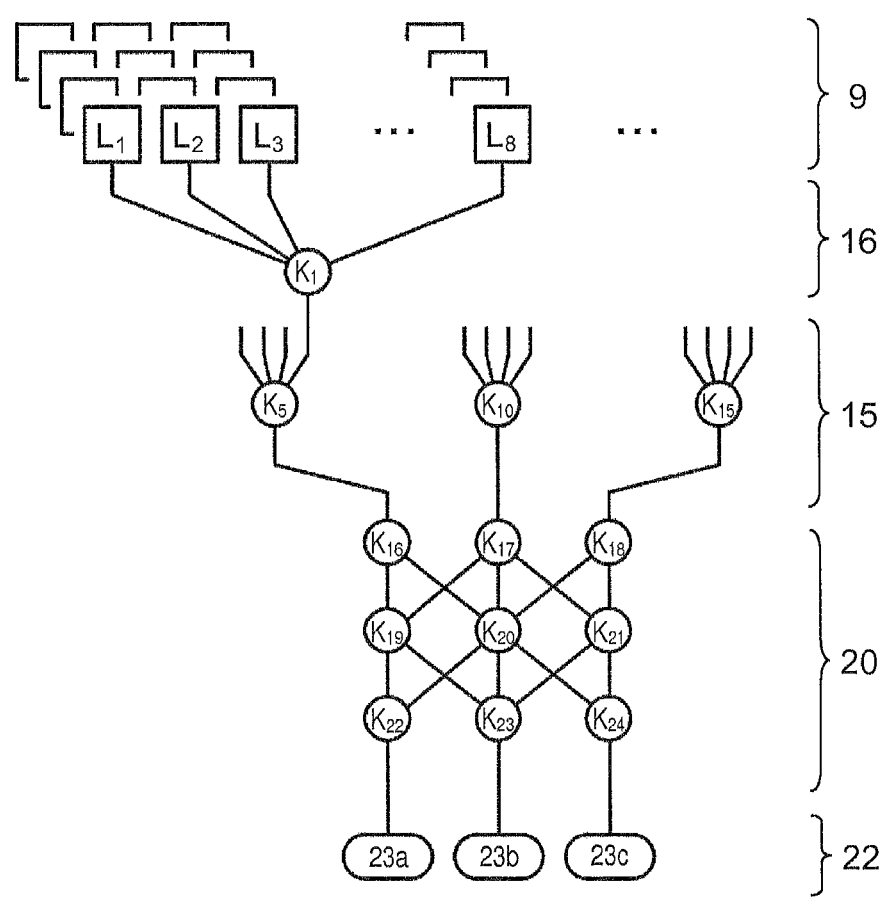
FIG. 43 shows a further example of a slightly more complex conveyor system, but without feedback route and sorting stage.

FIG. 43 shows a structure of an example of a conveyor system, which is very similar to the structure shown in FIG. 42. In contrast to this there is no annular conveyor, feedback routes and sorting steps/sequencers 24. By means of the network 20 however errors in an actual sequence can still be corrected. For example objects 17, which leave the node K16, are directed to node K19 or to node K20. At node K22 the conveyed objects 17 coming from nodes K19 and K20 can merge together again. The network can however be additionally or alternatively used to direct the conveyed objects 17 coming from the nodes K16, K17 and K18 to the destinations 23a, 23b and 23c.

Figure 44:
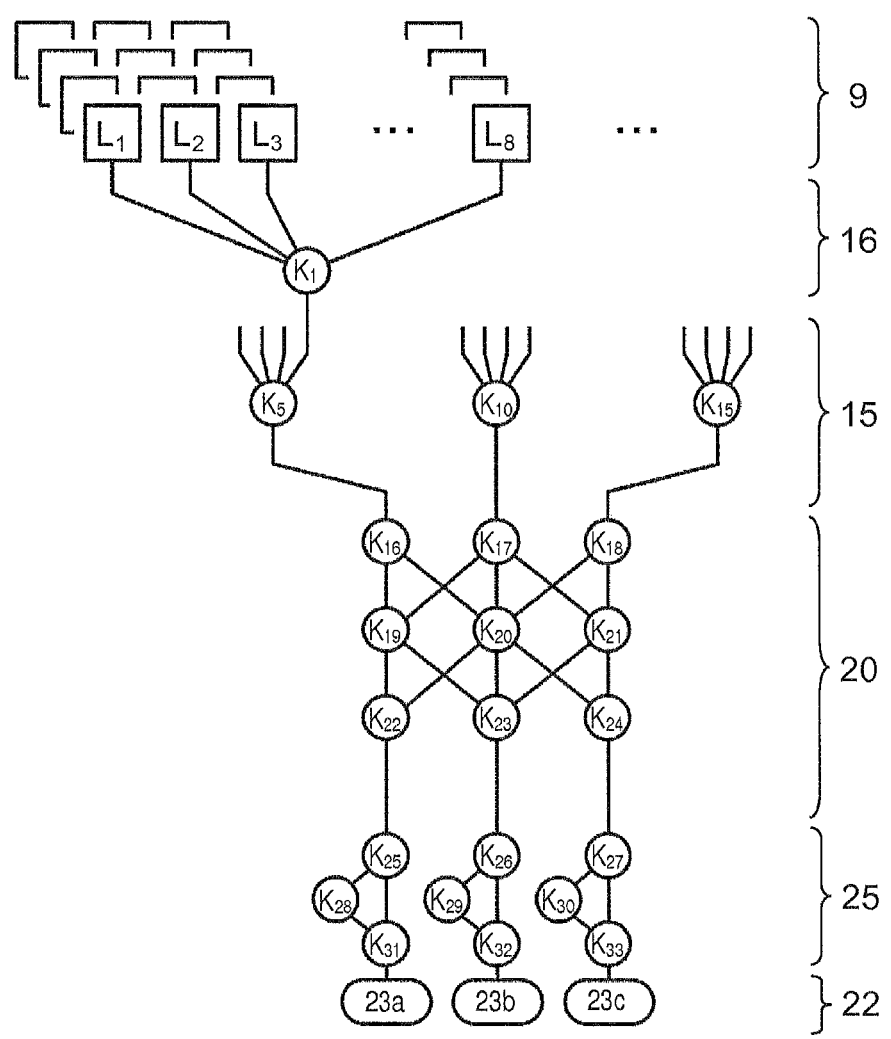
FIG. 44 similar to FIG. 43, but with additional alternative routes.

FIG. 44 shows a further example of a structure of a conveyor system, which is very similar to the structure shown in FIG. 43. In contrast however, separate alternative routes 25 can be provided in order to correct errors in a sorting sequence of an incoming conveyed stream.

It should be noted at this point that the release of conveyed objects 17 explained with reference to FIGS. 26 to 33 can also be applied by an evaluation parameter without the features of one aspect of the invention, that is also without the vectorial coupling. Furthermore, also another sorting algorithm can be superordinate to the release of conveyed objects 17 by means of an evaluation parameter.

For example, it is possible that a plurality of triggering devices downstream of the incoming conveyor segments 1*a*, 1*b* and linked logically by an OR link are used for the release of a holding device 4*a*, 4*b* or a conveyed object 17 and a holding device 4*a*, 4*b* or a conveyed object 17 waiting at this is released, if a conveyed object 17 preceding the waiting conveyed object 17 in a sorting sequence passes one of the linked triggering devices or there is no preceding conveyed object 17.

Figure 45:
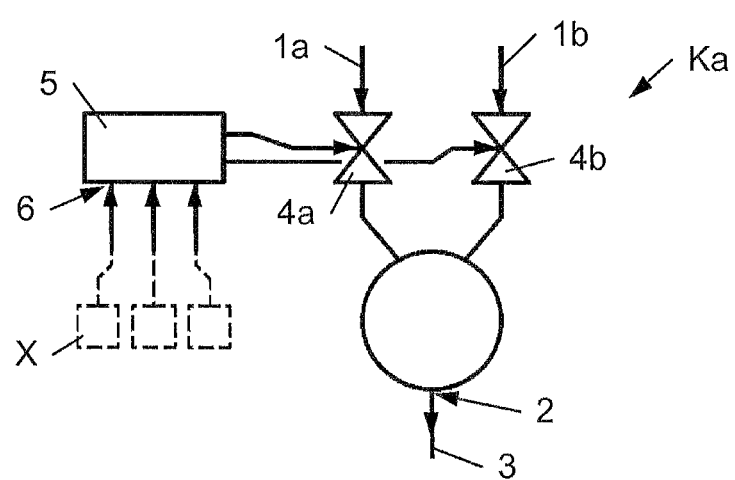
FIG. 45 similar to FIG. 1, but with a controller operating according to a different sorting method and FIG. 46 similar to FIG. 42, but with material handling elements/nodes according to FIG. 45.

FIG. 45 shows in a similar way to FIG. 1 an example of a material handling element Kc for bundling conveyed streams, in which the controller 5 is connected on the input side to a plurality of triggering devices X, which are subordinate to the material handling element/node Kc. A conveyed object 17 with the serial number n is released in this method only if the immediately or directly preceding conveyed object 17 with serial number n−1 passes an OR linked triggering device X, whereby it is possible in principle to form a precise actual sorting sequence at the destination.

Figure 46:
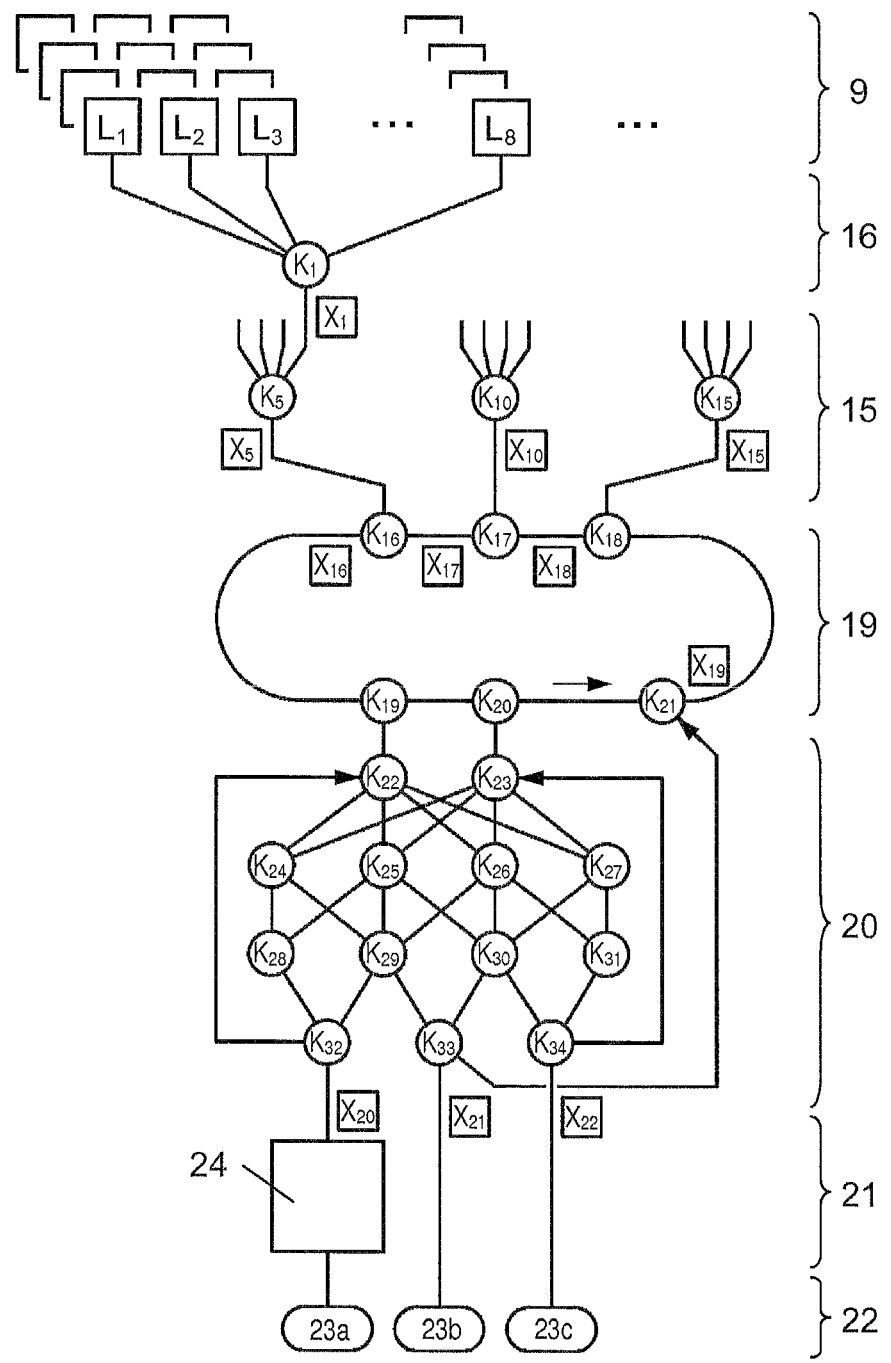

Similar to FIG. 42 FIG. 46 shows an example of how the triggering devices X can be distributed in a conveyor system. In particular, in this example a plurality of triggering devices X1 . . . X22 are provided. A triggering device X1 . . . X4, X6 . . . X9 and X11 . . . X14 is assigned on the receiving platform to each shuttle 16 and a triggering device X5, X10 and X15 on the lifting platform is assigned to each lift 15.

It should be noted in particular that the arrangement of the triggering devices X1 . . . X22 is only given by way of example, to illustrate the functioning of the conveyor system shown in FIG. 46 and of course can also be performed differently. In particular it should be noted that in the network 20 triggering devices X1 . . . X22 are not shown to provide a better overview. In an actual system of course triggering devices X1 . . . X22 can be provided in the network 20 at any point. Furthermore, it is noted that the interlinking of the nodes K1 . . . K34 with the triggering devices X1 . . . X22 is also not shown explicitly in FIG. 46, but would be provided in a real implementation of the conveyor system.

For example, at the inputs 6 of the material handling elements K1 the triggering device X5 and X16 can be connected. For example the triggering devices X16 . . . X19 can be connected to the material handling element K21. The material handling element K24 can be connected to not shown triggering devices in the network 20 and so on.

Also in connection with said sorting method it is possible to allow errors in a sorting sequence and correct them by means of a buffer, sequencer, alternative route or feedback route downstream of the material handling element/node Ka . . . Kz, K1 . . . K34. It is also possible that here a plurality of conveyed objects 17 have the same serial number in a sorting sequence, such as when similar conveyed objects 17 are to be grouped in a conveyed stream.

In summary, it can be said that the method defined according to one aspect of the invention can also be applied independently of the features of other aspects of the invention, in particular in connection with another sorting method, wherein further aspects of the invention can also be applied by analogy. This thus results in a method for bundling conveyed streams at a material handling element/node Ka . . . Kz, K1 . . . K34 with a plurality of incoming conveyor segments 1*a*, 1*b*, at least one coupling 2 to an outgoing conveyor segment 3, to which the incoming conveyor segments 1*a*, 1*b* are merged, and a plurality of holding devices 4*a*, 4*b* for halting conveyed objects 17 or a flow to the incoming conveyor segments 1*a*, 1*b*, wherein evaluation parameters are calculated for conveyed objects 17 waiting at the material handling element/node Ka . . . Kz, K1 . . . K34, the evaluation parameters are calculated a) by means of a priority of a sorting sequence, wherein higher priorities result in larger/smaller evaluation parameters, and/or b) a spatial and/or time interval between the waiting conveyed objects 17 and the preceding conveyed objects 17 in at least one sorting sequence, wherein conveyed objects 17 downstream of the material handling element/node Ka . . . Kz, K1 . . . K34 are evaluated as positive/negative and conveyed objects 17 upstream of the material handling element/node Ka . . . Kz, K1 . . . K34 are evaluated negatively/positively and the conveyed object 17 is released to which the greatest/smallest evaluation parameter is assigned.

Thus also a material handling element/node Ka . . . Kz, K1 . . . K34 is provided for bundling conveyed streams, comprising a plurality of incoming conveyor segments 1*a*, 1*b*, at least one coupling 2 for an outgoing conveyor segment 3, to which the incoming conveyor segments 1*a*, 1*b* are merged, and a plurality of holding devices 4*a*, 4*b* for halting a flow to the incoming conveyor segments 1*a*, 1*b*, also comprising a controller 5, which is configured, to calculate evaluation parameters for conveyed objects 17 waiting at the material handling element/node Ka . . . Kz, K1 . . . K34, to calculate the evaluation parameters a) by means of a priority of a sorting sequence, wherein higher priorities result in larger/smaller evaluation parameters, and/or b) a spatial and/or time interval between the waiting conveyed objects 17 and the preceding conveyed objects 17 in at least one sorting sequence, wherein conveyed objects 17 downstream of the material handling element/node Ka . . . Kz, K1 . . . K34 are evaluated positively/negatively and conveyed objects 17 upstream of the material handling element/node Ka . . . Kz, K1 . . . K34 are evaluated negatively/positively and to release the particular conveyed object 17, to which the largest/smallest evaluation parameter is assigned.

The situation is similar with the method according to another aspect of the invention, which can be applied not only in association with the features of other aspects of the invention, but also in connection with another sorting method and/or in association with another method for prioritizing conveyed objects 17 or in association with another type of calculation for the evaluation parameter. Further aspects of the invention can also be applied by analogy. The result is thus a method for bundling conveyed streams at a material handling element/node Ka . . . Kz, K1 . . . K34 with a plurality of incoming conveyor segments 1*a*, 1*b*, at least one coupling 2 to an outgoing conveyor segment 3, to which the incoming conveyor segments 1*a*, 1*b* are merged, and a plurality of holding devices 4*a*, 4*b* for halting conveyed objects 17 or a flow to the incoming conveyor segments 1*a*, 1*b*, wherein a conveyed object 17 waiting at a material handling element/node Ka . . . Kz, K1 . . . K34 is released, if a) the assigned evaluation parameter exceeds/does not meet a threshold and if b) a space in a buffer, sequencer, alternative route or feedback route 19, 20, 24, 25 downstream of the material handling element/node Ka . . . Kz, K1 . . . K34 is free or becomes free when the said conveyed object 17 arrives as planned at the buffer, the sequencer, the alternative route or the feedback route 19, 20, 24, 25 and the conveyed object 17 is transported therein.

Thus a material handling element/node Ka . . . Kz, K1 . . . K34 for bundling conveyed streams is also provided, comprising a plurality of incoming conveyor segments 1a, 1b, at least one coupling 2 for an outgoing conveyor segment 3, to which the incoming conveyor segments 1a, 1b are merged and a plurality of holding devices 4a, 4b for halting a flow on the incoming conveyor segments 1a, 1b, additionally comprising a controller 5, which is configured, to release a conveyed object 17 waiting at a material handling element/node Ka . . . Kz, K1 . . . K34, if a) the assigned evaluation parameter exceeds/does not meet a threshold and if b) a space is free or becomes free in a buffer, sequencer, alternative route or feedback route 19, 20, 24, 25 downstream of the material handling element/node Ka . . . Kz, K1 . . . K34, when the said conveyed object 17 arrives as planned at the buffer, the sequencer, the alternative route or the feedback route 19, 20, 24, 25.

Generally, the controller 5 can be provided in the hardware or also in the form of a software algorithm, which is performed in a processor. Furthermore, it is also possible that a plurality of entities of the said software algorithm are actuated in a computer.

Advantageously the material handling elements/nodes Ka . . . Kz, K1 . . . K34 access by writing and/or reading a joint vectorial coupling of the conveyed objects 17. For example, this can be saved in a central controller. If the controllers are actuated by a plurality of entities of a software algorithm in a computer, then the joint vectorial coupling of the conveyed objects 17 can be saved in particular on said computer.

Physically the connection between controllers 5, the connection of one controller 5 to a superordinate controller or also the connection of the triggering devices X1 . . . X22 to the controllers 5 can be wire-connected or wireless. For example the said connections can be formed by a bus system or by means of a wireless network.

Generally in a conveyor system of material handling elements K1 . . . K34 different release strategies can be used. For example, the material handling elements K1 . . . K15 can be configured to release a conveyed object 17 with the serial number n, if one of the preceding conveyed objects 17 with the serial number n−1 or n−2 passes one of the OR linked releasing devices X1 . . . X22, whereas the remaining material handling elements K16 . . . K34 can be designed for example to perform a releasing process with the aid of the vectorial coupling. If necessary, the instructions for releasing a conveyed object 17 can also be adjusted dynamically during operation, for example by a superordinate controller.

There are several options available for supplying several destinations 23a . . . 23c with conveyed objects 17. For example for each destination 23a . . . 23c separate vectorial links can be applied, by means of which the material handling elements K1 . . . K34 direct the conveyed objects 17 through the conveyor system. Any potential conflicts between the individual links can be solved for example by prioritizing the destinations 23a . . . 23c. However, it is also possible that for all destinations 23a . . . 23c a common vectorial coupling is applied. It is also possible that for all of the conveyed objects 17 contained in the vectorial coupling the formation of a ring with a constant sense of direction of the vectorial coupling is avoided, i.e. a sequence for all destinations 23a . . . 23c is adhered to strictly. It is also possible however that such rings which contain conveyed objects 17 with different destinations 23a . . . 23c are allowed and are only avoided for conveyed objects 17 with the same destinations 23a . . . 23c. This means that the conveyed objects 17 can arrive unsorted at their destinations 23a . . . 23c with respect to different destinations 23a . . . 23c, the conveyed objects 17 of a destinations 23a . . . 23c arrive in sorted form however.

The embodiments show possible embodiment variants of a material handling element Ka . . . Kz, K1 . . . K34 according to the invention or a conveyor system according to the invention, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field. Thus all conceivable embodiment variants are possible, which are formed by combining individual details of the embodiment variants shown and described.

In particular it should be noted that the shown devices in reality can also comprise more components than are shown.

Lastly, as a point of formality it should be noted that for a better understanding of the structure of a material handling element Ka . . . Kz, K1 . . . K34 or a conveyor system according to the invention the latter or its components have not been shown to scale in part and/or have been enlarged and/or have been reduced in size.

The independent solutions according to the invention can be taken from the description.

LIST OF REFERENCE NUMERALS

1a, 1b incoming conveyor segment
2 coupling for outgoing conveyor segment
3 outgoing conveyor segment
4a, 4b holding device
5 controller
6 input
7a, 7b sensor/reading device
8 output line
9 storage
10 storage and retrieval machine
11 rails
12 car
13 mast
14 lifting platform
15 lift
16 conveyor vehicle ("shuttle")
17 conveyed object
18 paternoster
19 loop
20 network
21 sorting area
22 picking area
23a . . . 23c destination
24 sorting step
25 alternative route
A1 . . . A5 serial number conveyed object first destination
B1 . . . B3 serial number conveyed object second destination
C1 . . . C4 serial number conveyed object third destination
Ka . . . Kz, K1 . . . K34 material handling element/node
L, L1 . . . L8, Lv storage space nk number of nodes
np number of conveyed objects
s length of conveyed stream
t throughput time of conveyed stream
X, X1 . . . X22 triggering device

The invention claimed is:

1. A method for bundling merging conveying streams at a material handling element with a plurality of incoming conveyor segments, at least one coupling to an outgoing conveyor segment, to which the incoming conveyor segments are merged, and a plurality of retainers configured to stop conveyed objects on the incoming conveyor segments, the method comprising:
vertorially linking the conveyed objects according to a target sorting sequence in ascending/descending order to form a vertorial linkage, and saving the vectorial linkage in a memory of a controller assigned to the material handling element and/or in a memory of a superordinate controller,
vectorially linking the conveyed objects of different target sorting sequences, which pass the material handling element, according to an actual sequence in ascending/descending order to form an additional vectorial linkage and
saving the additional vectorial linkage in the vectorial linkage already saved in the memory, and
releasing conveyed objects waiting at a material handling element in such a sequence which avoids formation of a ring with a constant sense of direction in the vertorial linkage saved in the memory representing a common vectorial linkage of target sorting sequences and the actual sequence.

2. The method as claimed in claim 1, wherein conveyed objects waiting at a material handling element are only released in a sequence, which avoids the formation of a ring with a constant sense of direction of the vectorial linkage.

3. The method as claimed in claim 1, wherein a plurality of conveyed objects have an identical serial number in the target sorting sequence.

4. The method as claimed in claim 1, wherein releases per unit of time are monitored by the superordinate controller and a particular retainer is released, at which the conveyed object with a lowest serial number is waiting, if a threshold is not met for the releases per unit of time.

5. The method as claimed in claim 4, wherein the releases per unit of time to each destination of a plurality of destinations to be supplied are monitored by the superordinate controller and the particular retainer is released, at which the conveyed object with the lowest serial number of a relevant destination of the plurality of destinations is waiting, if a threshold is not met for the releases per unit of time assigned to the relevant destination.

6. The method as claimed in claim 1, further comprising calculating with the controller or the superordinate controller for at least those conveyed objects waiting at the material handling element evaluation parameters, which avoid formation of a ring with a constant sense of direction in the vectorial linkage,
the evaluation parameters are calculated a) by using a priority of the target sorting sequence, wherein higher priorities result in higher/lower evaluation parameters, and/or b) by using differences of spatial intervals and/or time intervals, wherein a difference is defined as a spatial interval and/or time interval of a waiting conveyed object to a destination or downstream material handling element minus a spatial interval and/or time interval of the preceding conveyed objects in a sorting sequence to the destination or to said downstream material handling element and
a particular conveyed object is released, to which a largest/smallest evaluation parameter is assigned.

7. The method as claimed in claim 6, wherein the difference is determined with the controller or the superordinate controller by using a length of a conveying stream having ends between the waiting conveyed object and the destination or the downstream material handling element, and is determined by using the length of a conveying stream having ends between the preceding conveyed object in the target sorting sequence and the destination or the downstream material handling element.

8. The method as claimed in claim 6, wherein the difference is determined with the controller or the superordinate controller by using a number of conveyed objects between the waiting conveyed object and the destination or the downstream material handling element, and is determined by using the number of conveyed objects which are between the preceding conveyed object in the target sorting sequence and the destination or the downstream material handling element.

9. The method as claimed in claim 6, wherein the difference is determined with the controller or the superordinate controller by using a number of material handling elements between the waiting conveyed object and the destination or the downstream material handling element, and is determined by using the number of material handling elements between the preceding conveyed object in the target sorting sequence and the destination or the downstream material handling element.

10. The method as claimed in claim 6, wherein the difference is determined with the controller or the superordinate controller by using a number of vectors in the vectorial linkage, which are between the waiting conveyed object and the destination or the downstream material handling element, and is determined by using the number of vectors which are between the preceding conveyed object in the target sorting sequence and the destination or the downstream material handling element.

11. The method as claimed in claim 6, wherein the difference is determined with the controller or the superordinate controller by using a time span for passing of a conveying stream, having ends between the waiting conveyed object and the destination or the downstream material handling element, and is determined by using a time span of a conveying stream having ends between the preceding conveyed object in the target sorting sequence and the destination or the downstream material handling element.

12. The method as claimed in claim 1 wherein the at least one coupling for an outgoing conveyor segment of one material handling element is connected directly or indirectly to an incoming conveyor segment of another material handling element.

13. The method as claimed in claim 12, wherein at least method steps which are assigned to a decision about the release of a conveyed object apart from taking into account the vectorial linkage are performed independently of all other material handling elements and/or independently of a central controller.

14. The method as claimed in claim 12, wherein method steps are performed identically with respect to the release of a conveyed object in all material handling elements.

15. The method as claimed in claim 12, wherein the material handling elements access the same common vectorial linkage of the conveyed objects.

16. The method as claimed in claim 15 for operating, wherein the material handling element comprises a robot.

17. The method as claimed in claim 16, wherein conveyed objects are removed from a storage in an ordered manner with respect to a plurality of destinations and with respect to a sorting sequence for a destination to be supplied.

18. The method as claimed in claim 16, wherein conveyed objects are removed from a storage in an ordered manner with respect to the target sorting sequence for a destination to be supplied, but chaotically with respect to a plurality of destinations.

19. The method as claimed in claim 1, further comprising:
calculating with the controller or the superordinate controller for at least those conveyed objects waiting at the material handling element evaluation parameters which avoid the formation of a ring with a constant sense of direction in the vectorial linkage,
wherein the evaluation parameters are calculated a) by using a priority the target sorting sequence, wherein higher priorities result in larger/smaller evaluation parameters, and/or b) by using a spatial interval and/or time interval between the waiting conveyed objects and the preceding conveyed objects in the target sorting sequence, wherein conveyed objects downstream of the material handling element are evaluated positively/negatively and conveyed objects upstream of the material handling element are evaluated negatively/positively and a particular conveyed object is released, to which a largest/smallest evaluation parameter is assigned.

20. The method as claimed in claim 19, further comprising determining with the controller or the superordinate controller the spatial interval by using a length of a conveyed stream, having ends between a waiting conveyed object and the preceding conveyed object in the target sorting sequence.

21. The method as claimed in claim 19, further comprising determining with the controller or the superordinate controller the spatial interval by using a number of conveyed objects between a waiting conveyed object and the preceding conveyed object in the target sorting sequence.

22. The method as claimed in claim 19, further comprising determining with the controller or the superordinate controller the spatial interval by using a number of material handling elements between a waiting conveyed object and the preceding conveyed object in the target sorting sequence.

23. The method as claimed in claim 19, further comprising determining with the controller or the superordinate controller the spatial interval by using a number of vectors in the vectorial linkage between a waiting conveyed object and the preceding conveyed object in the target sorting sequence.

24. The method as claimed in claim 19, further comprising determining with the controller or the superordinate controller the time interval by using a time span for passing of a conveying stream having ends between a waiting conveyed object and the preceding conveyed object in the target sorting sequence.

25. The method as claimed in claim 19, wherein
a conveyed object waiting at a material handling element is released which forms a ring with a constant sense of direction of the vectorial linkage, if a) the assigned evaluation parameter exceeds/does not meet a threshold and if b) a space is free or becomes free in a buffer, sequencer, alternative route or feedback route downstream of the material handling element, when the conveyed object reaches the buffer, the sequencer, the alternative route or the feedback route as planned and the conveyed object is transported into the buffer, the sequencer, the alternative route or the feedback route.

26. The method as claimed in claim 25, wherein a vector closing the ring
is not entered in the vectorial linkage or
is deleted from the vectorial linkage, if the said conveyed object is transported into the buffer, the sequencer, the alternative route or the feedback route.

27. A material handling element for merging conveying streams, comprising
a plurality of incoming conveyor segments,
at least one coupling for an outgoing conveyor segment, to which the incoming conveyor segments are merged,
a plurality of retainers configured to stop a conveying flow on the incoming conveyor segment segments, and
a controller which is configured
to form a vectorial linkage by vectorially linking conveyed objects with different target sorting sequences, which are vectorially linked according to a respective target sorting sequence in ascending/descending order save the vectorial linkage in a memory of the controller and/or in a memory of a superordinate controller,
to vectorially link the conveyed objects of different target sorting sequences, which pass the material handling element, according to an actual sequence in ascending/descending order, and to save an additional the vectorial linkage in the already saved vectorial linkage, and
to release conveyed objects waiting at a material handling element in such a sequence which avoids formation of a ring with a constant sense of direction in the vectorial linkage saved in the memory representing a common vectorial linkage of target sorting sequences and the actual sequence.

28. A conveyor system, comprising a plurality of material handling elements, a material handling element of the plurality of material handling elements comprising:
a plurality of incoming conveyor segments,
at least one coupling for an outgoing conveyor segment , to which the incoming conveyor segments are merged,
a plurality of retainers configured to stop a conveying flow on the incoming conveyor segments, and
a controller which is configured
to form a vectorial linkage by vectorially linking conveyed objects with different target sorting sequences, which are vectorially linked according to a respective target sorting sequence in ascending/descending order and to save the vectorial linkage in a memory of the controller and/or in a memory of a superordinate controller,
to vectorially link the conveyed objects of different target sorting sequences, which pass the material handling element, according to an actual sequence in ascending/descending order, and to save an additional vectorial linkage in the already saved vectorial linkage, and
to release conveyed objects waiting at a material handling element in such a sequence which avoids formation of a ring with a constant sense of direction in the vectorial linkage saved in the memory representing a common vectorial linkage of target sorting sequences and the actual sequence,
wherein at least one coupling for an outgoing conveyor segment of one of the material handling elements is connected directly or indirectly to an incoming conveyor segment of another of the material handling elements.

29. The conveyor system as claimed in claim 28, wherein a program logic is designed to be identical with regard to the release of a conveyed object in all material handling elements.

* * * * *

UNITED STATES PATENT AND TRADEMARK OFFICE
CERTIFICATE OF CORRECTION

PATENT NO. : 10,865,054 B2
APPLICATION NO. : 16/064029
DATED : December 15, 2020
INVENTOR(S) : Christian Ahammer et al.

It is certified that error appears in the above-identified patent and that said Letters Patent is hereby corrected as shown below:

In the Claims

Claim 11, Line 4 (Column 30, Line 44): after "stream" delete ","
Claim 16, Line 1 (Column 31, Line 1): delete "for operating"
Claim 19, Line 8 (Column 31, Line 19): after "priority" insert --of--
Claim 20, Line 4 (Column 31, Line 34): after "stream" delete ","
Claim 27, Line 13 (Column 32, Line 21): after "order" insert --and to--

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*